United States Patent
Rudolf et al.

(10) Patent No.: US 12,501,488 B2
(45) Date of Patent: Dec. 16, 2025

(54) CONDITIONAL RANDOM ACCESS CHANNEL TRANSMISSION IN FULL-DUPLEX SYSTEMS

(71) Applicant: Samsung Electronics Co., Ltd., Suwon-si (KR)

(72) Inventors: Marian Rudolf, Longueuil (CA); Aristides Papasakellariou, Houston, TX (US); Carmela Cozzo, San Diego, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 412 days.

(21) Appl. No.: 17/814,813

(22) Filed: Jul. 25, 2022

(65) Prior Publication Data

US 2023/0062577 A1 Mar. 2, 2023

Related U.S. Application Data

(60) Provisional application No. 63/232,017, filed on Aug. 11, 2021.

(51) Int. Cl.
*H04W 74/0833* (2024.01)
*H04W 74/00* (2009.01)
(Continued)

(52) U.S. Cl.
CPC ..... *H04W 74/0833* (2013.01); *H04W 74/002* (2013.01); *H04W 74/0836* (2024.01); *H04W 74/0838* (2024.01)

(58) Field of Classification Search
CPC .......... H04W 74/0833; H04W 74/002
(Continued)

(56) References Cited

U.S. PATENT DOCUMENTS

2019/0239254 A1 8/2019 Su et al.
2019/0327766 A1 10/2019 Zhang et al.
(Continued)

FOREIGN PATENT DOCUMENTS

WO 2020143776 A1 7/2020
WO 2021063344 A1 4/2021

OTHER PUBLICATIONS

"3rd Generation Partnership Project; Technical Specification Group Radio Access Network; NR; Physical channels and modulation (Release 16)", 3GPP TS 38.211 V16.6.0, Jun. 2021, 134 pages.
(Continued)

*Primary Examiner* — Nicholas R Taylor
*Assistant Examiner* — Chong G Kim

(57) ABSTRACT

Methods and apparatuses for random access (RA) in full-duplex (FD) wireless communication systems. A method for transmitting a random access channel (RACH) associated with a RA procedure includes receiving first information for first parameters of a first RACH configuration associated with a first subset of slots from a set of slots on a cell, second information for second parameters of a second RACH configuration associated with a second subset of slots from the set of slots on the cell, and third information for a condition. The method further includes determining whether the condition is valid for transmission in a slot from the second subset of slots and transmitting a RACH in the slot based on: the first RACH configuration when the condition is valid, and the second RACH configuration when the condition is not valid.

20 Claims, 20 Drawing Sheets

(51) Int. Cl.
  *H04W 74/0836* (2024.01)
  *H04W 74/0838* (2024.01)
(58) Field of Classification Search
  USPC .......................................... 370/329
  See application file for complete search history.

(56) References Cited

U.S. PATENT DOCUMENTS

| | | |
|---|---|---|
| 2020/0314890 A1 | 10/2020 | Wang et al. |
| 2021/0337605 A1* | 10/2021 | Yuan ..................... H04W 72/27 |
| 2021/0345410 A1* | 11/2021 | Zhou ..................... H04W 52/50 |
| 2022/0217781 A1* | 7/2022 | Decarreau ............. H04W 24/10 |
| 2022/0225425 A1 | 7/2022 | King et al. |
| 2024/0040627 A1* | 2/2024 | He ............................ H04L 1/18 |
| 2024/0049289 A1* | 2/2024 | Ko ..................... H04W 74/0833 |
| 2024/0129958 A1* | 4/2024 | Zheng .................. H04L 5/0028 |

OTHER PUBLICATIONS

"3rd Generation Partnership Project; Technical Specification Group Radio Access Network; NR; Multiplexing and channel coding (Release 16)", 3GPP TS 38.212 V16.6.0, Jun. 2021, 153 pages.

"3rd Generation Partnership Project; Technical Specification Group Radio Access Network; NR; Physical layer procedures for control (Release 16)", 3GPP TS 38.213 V16.6.0, Jun. 2021, 187 pages.

"3rd Generation Partnership Project; Technical Specification Group Radio Access Network; NR; Physical layer procedures for data (Release 16)", 3GPP TS 38.214 V16.6.0, Jun. 2021, 172 pages.

"3rd Generation Partnership Project; Technical Specification Group Radio Access Network; NR; Radio Resource Control (RRC) protocol specification (Release 16)", 3GPP TS 38.331 V16.5.0, Jun. 2021, 964 pages.

"3rd Generation Partnership Project; Technical Specification Group Radio Access Network; NR; Medium Access Control (MAC) protocol specification (Release 16)", 3GPP TS 38.321 V16.5.0, Jun. 2021, 157 pages.

"5G; NR; Requirements for support of radio resource management (3GPP TS 38.133 version 16.8.0 Release 16)", ETSI TS 138 133 V16.8.0, Sep. 2021, 2886 pages.

International Search Report and Written Opinion issued Nov. 7, 2022 regarding International Application No. PCT/KR2022/011691, 8 pages.

* cited by examiner

CONDITIONAL RANDOM ACCESS CHANNEL TRANSMISSION IN FULL-DUPLEX SYSTEMS

CROSS-REFERENCE TO RELATED APPLICATION AND CLAIM OF PRIORITY

This application claims priority under 35 U.S.C. § 119(e) to U.S. Provisional Patent Application No. 63/232,017 filed on Aug. 11, 2021. The above-identified provisional patent applications are hereby incorporated by reference in their entirety.

TECHNICAL FIELD

The present disclosure relates generally to wireless communication systems and, more specifically, the present disclosure relates to random access (RA) in full-duplex (FD) systems.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

This disclosure relates to RA in FD systems.

In one embodiment, a method for transmitting a random access channel (RACH) associated with a RA procedure is provided. The method includes receiving first information for first parameters of a first RACH configuration associated with a first subset of slots from a set of slots on a cell, second information for second parameters of a second RACH configuration associated with a second subset of slots from the set of slots on the cell, and third information for a condition. The method further includes determining whether the condition is valid for transmission in a slot from the second subset of slots and transmitting a RACH in the slot based on: the first RACH configuration when the condition is valid, and the second RACH configuration when the condition is not valid.

In another embodiment, a user equipment (UE) for transmitting a RACH associated with a RA procedure. The UE includes a transceiver configured to receive first information for first parameters of a first RACH configuration associated with a first subset of slots from a set of slots on a cell, second information for second parameters of a second RACH configuration associated with a second subset of slots from the set of slots on the cell, and third information for a condition. The UE further includes a processor operably coupled to the transceiver. The processor configured to determine whether the condition is valid for transmission in a slot from the second subset of slots. The transceiver is further configured to transmit a RACH in the slot based on the first RACH configuration when the condition is valid and the second RACH configuration when the condition is not valid.

In yet another embodiment, a base station is provided. The BS includes a transceiver configured to transmit first information for first parameters of a first RACH configuration associated with a first subset of slots from a set of slots on a cell, transmit second information for second parameters of a second RACH configuration associated with a second subset of slots from the set of slots on the cell, transmit third information for a condition, and receive, for a RA procedure, a RACH in a slot based on: the first RACH configuration when the condition is valid, and the second RACH configuration when the condition is not valid.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
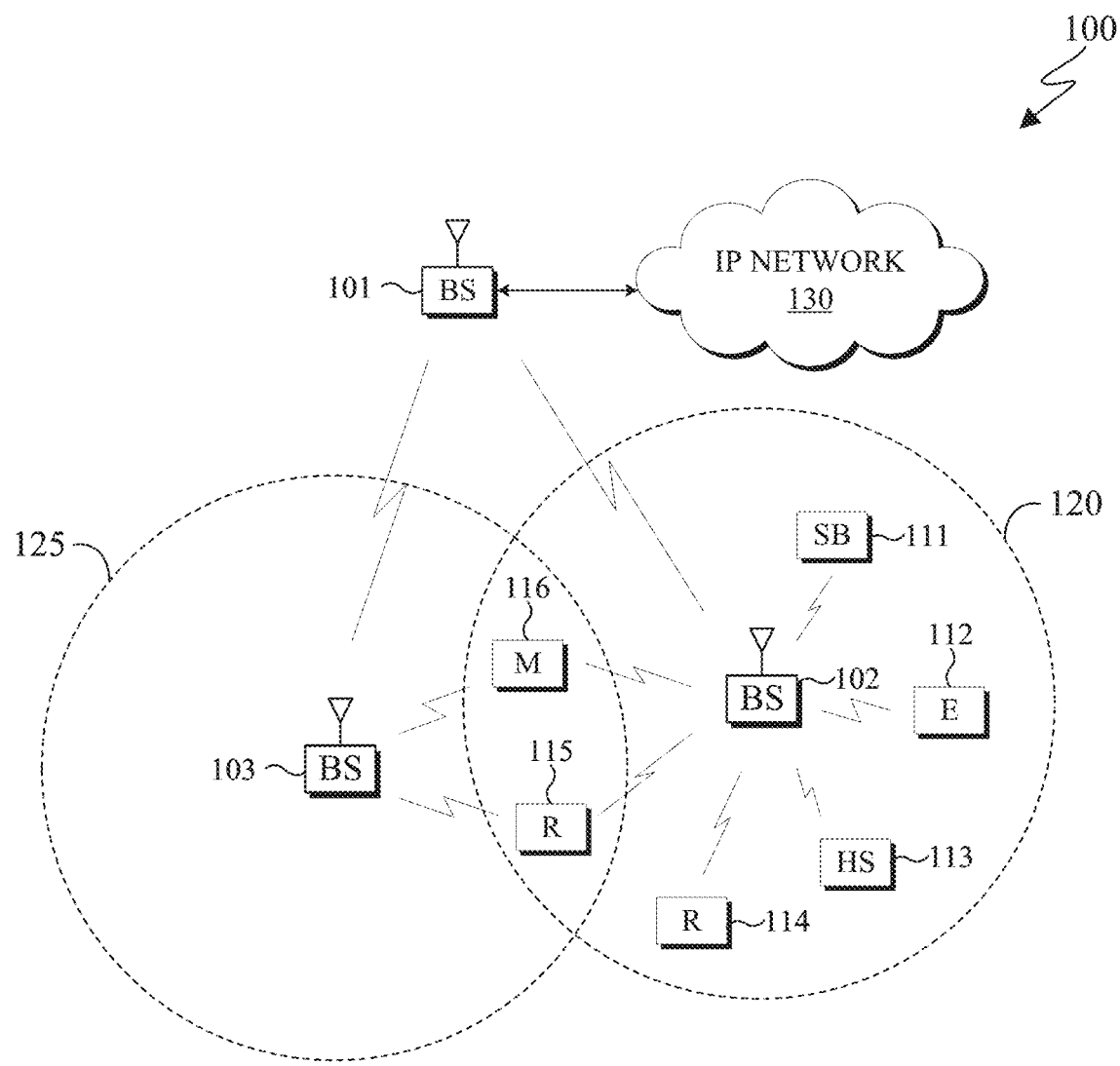
FIG. 1 illustrates an example wireless network according to embodiments of the present disclosure.

FIGS. 1 through 22, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

The following documents are hereby incorporated by reference into the present disclosure as if fully set forth herein: 3GPP TS 38.211 v16.6.0, "NR; Physical channels and modulation" (REF1); 3GPP TS 38.212 v16.6.0, "NR; Multiplexing and Channel coding" (REF2); 3GPP TS 38.213 v16.6.0, "NR; Physical Layer Procedures for Control" (REF3); 3GPP TS 38.214 v16.6.0, "NR; Physical Layer Procedures for Data" (REF4); 3GPP TS 38.321 v16.5.0, "NR; Medium Access Control (MAC) protocol specification" (REF5); 3GPP TS 38.331 v16.5.0, "NR; Radio Resource Control (RRC) Protocol Specification" (REF6); and 3GPP TS 38.133 v16.8.0, "NR; Requirements for support of radio resource management" (REF7).

To meet the demand for wireless data traffic having increased since deployment of the fourth generation (4G) communication systems, efforts have been made to develop and deploy an improved 5th generation (5G) or pre-5G/NR communication system. Therefore, the 5G or pre-5G communication system is also called a "beyond 4G network" or a "post long term evolution (LTE) system."

The 5G communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, coordinated multi-points (CoMP), reception-end interference cancelation and the like.

The discussion of 5G systems and frequency bands associated therewith is for reference as certain embodiments of the present disclosure may be implemented in 5G systems. However, the present disclosure is not limited to 5G systems, or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Depending on the network type, the term 'base station' (BS) can refer to any component (or collection of components) configured to provide wireless access to a network, such as transmit point (TP), transmit-receive point (TRP), an enhanced base station (eNodeB or eNB), a gNB, a macrocell, a femtocell, a WiFi access point (AP), a satellite, or other wirelessly enabled devices. Base stations may provide wireless access in accordance with one or more wireless communication protocols, e.g., 5G 3GPP New Radio Interface/Access (NR), LTE, LTE advanced (LTE-A), High Speed Packet Access (HSPA), Wi-Fi 802.11a/b/g/n/ac, etc. The terms 'BS,' 'gNB,' and 'TRP' can be used interchangeably in this disclosure to refer to network infrastructure components that provide wireless access to remote terminals. Also, depending on the network type, the term 'user equipment' (UE) can refer to any component such as mobile station, subscriber station, remote terminal, wireless terminal, receive point, vehicle, or user device. For example, a UE could be a mobile telephone, a smartphone, a monitoring device, an alarm device, a fleet management device, an asset tracking device, an automobile, a desktop computer, an entertainment device, an infotainment device, a vending machine, an electricity meter, a water meter, a gas meter, a security device, a sensor device, an appliance, and the like.

5G radio supports flexible spectrum utilization from 400 MHz to 90 GHz for licensed, unlicensed, and shared spectrum bands, narrow-band and wideband allocations with bandwidth parts, carrier aggregation, dual-connectivity, and dynamic spectrum sharing, achieves higher spectrum occupancy than LTE, and utilizes flexible control channel assignments in time and frequency domains. In-built support since 3GPP Release 15 for massive MIMO and beamforming greatly enhances achievable coverage and spectral efficiency when using 5G radio. Flexible orthogonal frequency division multiplexing (OFDM) numerology, short transmission time and scheduling delays, self-contained slots, asynchronous hybrid automatic repeat request acknowledgement (HARQ), minimal overhead from DL common signals and channels, adaptive reference signals and low-density parity check (LDPC) and Polar channel coding enable more flexibility and faster processing with 5G radio when compared to LTE.

In addition, 5G radio provides optimized support for additional services and features in 3GPP Release 16 such as vehicular (V2X) and device-to-device (D2D) communications, wireless backhauling (IAB), coordinated multi-point (COMP) or Multi-TRP transmission and reception (multi-TRP), cross-link interference (CLI) and remote interference (RIM) detection and avoidance, and NR operation in unlicensed bands (NR-U).

Figure 2:
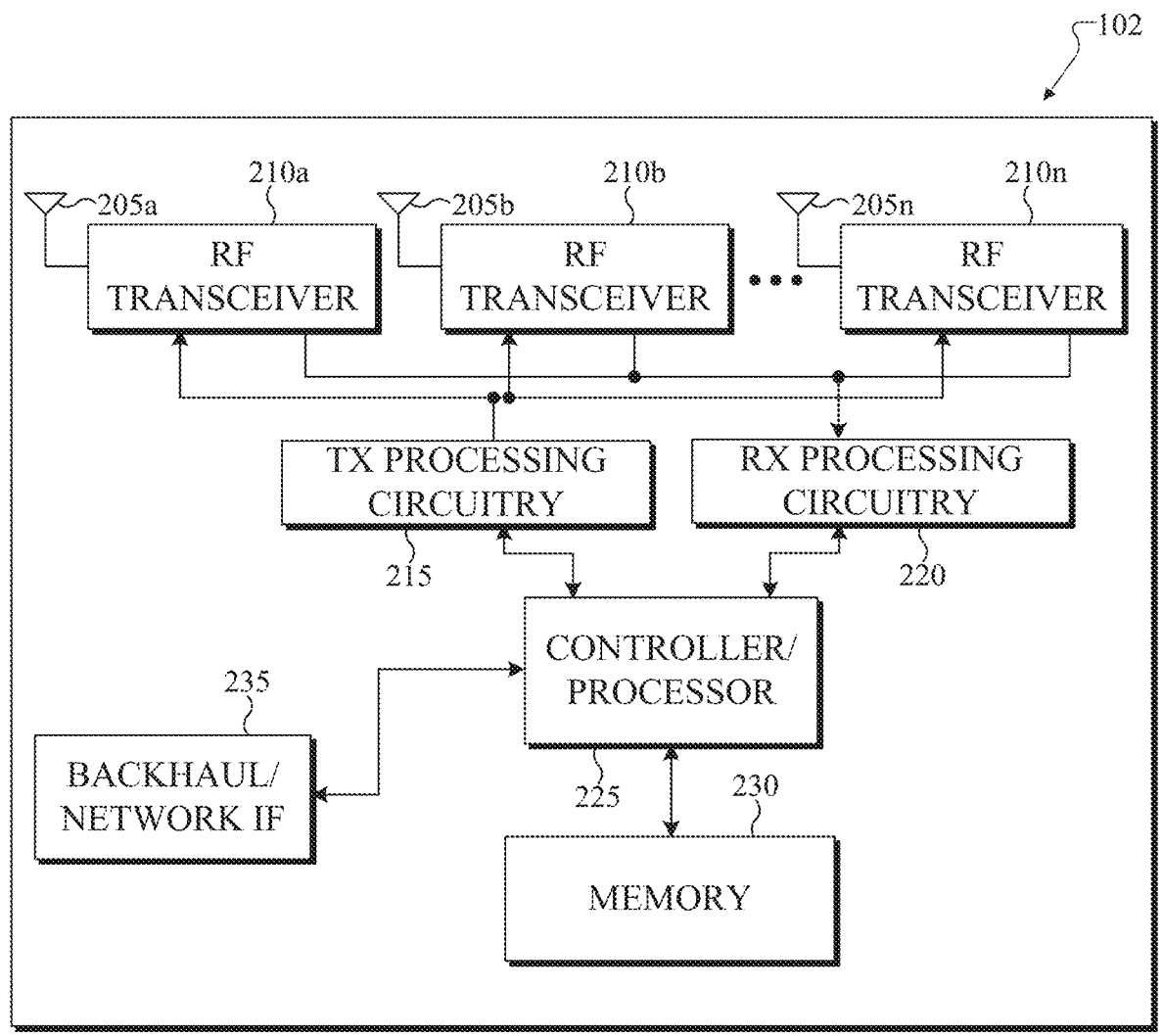
FIG. 2 illustrates an example BS according to embodiments of the present disclosure.
Figure 3:
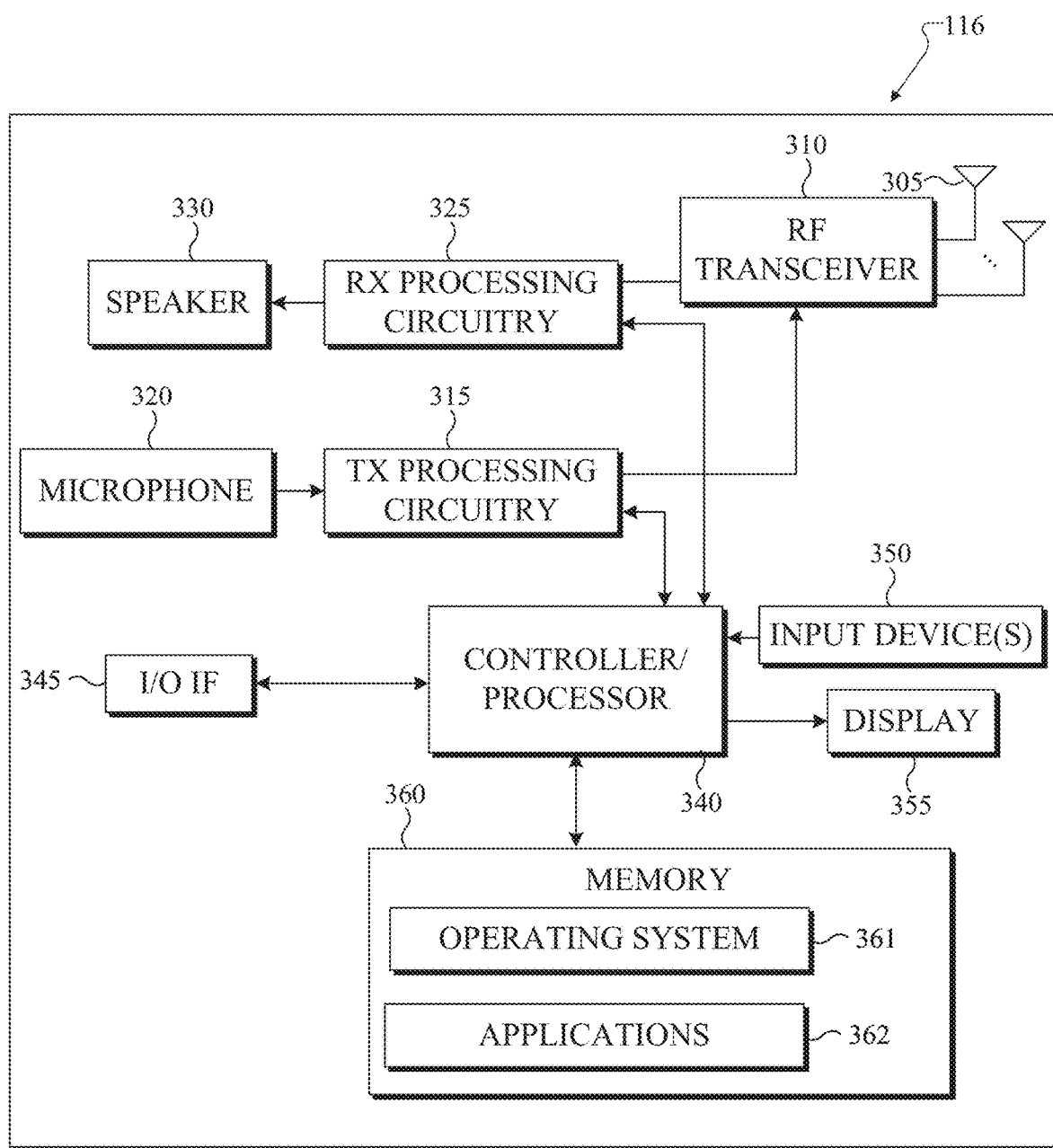
FIG. 3 illustrates an example UE according to embodiments of the present disclosure.

FIGS. 1-3 below describe various embodiments implemented in wireless communications systems and with the use of OFDM or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network 100 according to embodiments of the present disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes a base station, BS 101 (e.g., gNB), a BS 102, and a BS 103. The BS 101 communicates with the BS 102 and the BS 103. The BS 101 also communicates with at least one network 130, such as the Internet, a proprietary Internet Protocol (IP) network, or other data network.

The BS 102 provides wireless broadband access to the network 130 for a first plurality of user equipment's (UEs) within a coverage area 120 of the BS 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The BS 103 provides wireless broadband access to the network 130 for a second plurality of UEs within a coverage area 125 of the BS 103. The second plurality of UEs includes the UE 115 and the UE 116. In some embodiments, one or more of the BSs 101-103 may communicate with each other and with the UEs 111-116 using 5G/NR, long term evolution (LTE), long term evolution-advanced (LTE-A), WiMAX, WiFi, or other wireless communication techniques.

Dotted lines show the approximate extents of the coverage areas 120 and 125, which are shown as approximately circular for the purposes of illustration and explanation only. It should be clearly understood that the coverage areas associated with BSs, such as the coverage areas 120 and 125, may have other shapes, including irregular shapes, depending upon the configuration of the BSs and variations in the radio environment associated with natural and man-made obstructions.

As described in more detail below, one or more of the UEs 111-116 include circuitry, programing, or a combination thereof for efficient RA by UE. In certain embodiments, and one or more of the BSs 101-103 includes circuitry, programing, or a combination thereof for efficient RA by UE.

Although FIG. 1 illustrates one example of a wireless network, various changes may be made to FIG. 1. For example, the wireless network could include any number of BSs and any number of UEs in any suitable arrangement. Also, the BS 101 could communicate directly with any number of UEs and provide those UEs with wireless broadband access to the network 130. Similarly, each BS 102-103 could communicate directly with the network 130 and provide UEs with direct wireless broadband access to the network 130. Further, the BSs 101, 102, and/or 103 could provide access to other or additional external networks, such as external telephone networks or other types of data networks.

FIG. 2 illustrates an example BS 102 according to embodiments of the present disclosure. The embodiment of the BS 102 illustrated in FIG. 2 is for illustration only, and the BSs 101 and 103 of FIG. 1 could have the same or similar configuration. However, BSs come in a wide variety of configurations, and FIG. 2 does not limit the scope of this disclosure to any particular implementation of a BS.

As shown in FIG. 2, the BS 102 includes multiple antennas 205a-205n, multiple radio frequency (RF) transceivers 210a-210n, transmit (TX) processing circuitry 215, and receive (RX) processing circuitry 220. The BS 102 also includes a controller/processor 225, a memory 230, and a backhaul or network interface 235.

The RF transceivers 210a-210n receive, from the antennas 205a-205n, incoming RF signals, such as signals transmitted by UEs in the wireless network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the BS 102. For example, the controller/processor 225 could control the reception of uplink channel signals and the transmission of downlink channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support directional routing operations in which outgoing/incoming signals from/to multiple antennas 205a-205n are weighted differently to effectively steer the outgoing signals in a desired direction. Any of a wide variety of other functions could be supported in the BS 102 by the controller/processor 225. In some embodiments, the controller/processor 225 includes at least one microprocessor or microcontroller.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the BS 102 to communicate with other devices or systems over a backhaul connection or over a network. The network interface 235 could support communications over any suitable wired or wireless connection(s). For example, when the BS 102 is implemented as part of a cellular communication system (such as one supporting 5G/NR, LTE, or LTE-A), the network interface 235 could allow the BS 102 to communicate with other BS s over a wired or wireless backhaul connection. When the BS 102 is implemented as an access point, the network interface 235 could allow the BS 102 to communicate over a wired or wireless local area network or over a wired or wireless connection to a larger network (such as the Internet). The network interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of BS 102, various changes may be made to FIG. 2. For example, the BS 102 could include any number of each component shown in FIG. 2. As a particular example, an access point could include a number of network interfaces 235, and the controller/processor 225 could support routing functions to route data between different network addresses. As another particular example, while shown as including a single instance of TX processing circuitry 215 and a single instance of RX processing circuitry 220, the BS 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a RF transceiver 310, TX processing circuitry 315, a microphone 320, and receive (RX) processing circuitry 325. The UE 116 also includes a speaker 330, a processor 340, an input/output (I/O) interface (IF) 345, an input device 350, a display 355, and a memory 360. The memory 360 includes an operating system (OS) 361 and one or more applications 362.

The RF transceiver 310 receives, from the antenna 305, an incoming RF signal transmitted by a BS of the wireless network 100. The RF transceiver 310 down-converts the incoming RF signal to generate an intermediate frequency (IF) or baseband signal. The IF or baseband signal is sent to the RX processing circuitry 325 that generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of uplink channel signals and the transmission of downlink channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for beam management. The processor 340 can move data into or out of the memory 360 as required by an executing process. In some embodiments, the processor 340 is configured to execute the applications 362 based on the OS 361 or in response to signals received from BSs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input device 350. The operator of the UE 116 can use the input device 350 to enter data into the UE 116. The input device 350 can be a keyboard, touchscreen, mouse, track ball, voice input, or other device capable of acting as a user interface to allow a user in interact with the UE 116. For example, the input device 350 can include voice recognition processing, thereby allowing a user to input a voice command. In another example, the input device 350 can include a touch panel, a (digital) pen sensor, a key, or an ultrasonic input device. The touch panel can recognize, for example, a touch input in at least one scheme, such as a capacitive scheme, a pressure sensitive scheme, an infrared scheme, or an ultrasonic scheme.

The processor 340 is also coupled to the display 355. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

A communication system can include a downlink (DL) that refers to transmissions from a base station (such as the BS 102) or one or more transmission points to UEs (such as the UE 116) and an uplink (UL) that refers to transmissions from UEs (such as the UE 116) to a base station (such as the BS 102) or to one or more reception points.

A time unit for DL signaling or for UL signaling on a cell is referred to as a slot and can include one or more symbols. A symbol can also serve as an additional time unit. A frequency (or bandwidth (BW)) unit is referred to as a resource block (RB). One RB includes a number of sub-carriers (SCs). For example, a slot can have duration of 1 millisecond or 0.5 millisecond, include 14 symbols and an RB can include 12 SCs with inter-SC spacing of 15 kHz or 30 kHz, and so on.

DL signals include data signals conveying information content, control signals conveying DL control information (DCI), and reference signals (RS) that are also known as pilot signals. A gNB transmits data information or DCI through respective physical DL shared channels (PDSCHs) or physical DL control channels (PDCCHs). A PDSCH or a PDCCH can be transmitted over a variable number of slot symbols including one slot symbol. For brevity, a DCI format scheduling a PDSCH reception by a UE is referred to as a DL DCI format and a DCI format scheduling a physical uplink shared channel (PUSCH) transmission from a UE is referred to as an UL DCI format.

A gNB (such as the BS 102) transmits one or more of multiple types of RS including channel state information RS (CSI-RS) and demodulation RS (DM-RS). A CSI-RS is primarily intended for UEs to perform measurements and provide channel state information (CSI) to a gNB. For channel measurement, non-zero power CSI-RS (NZP CSI-RS) resources are used. For interference measurement reports (IMRs), CSI interference measurement (CSI-IM) resources associated with a zero power CSI-RS (ZP CSI-RS) configuration are used. A CSI process consists of NZP CSI-RS and CSI-IM resources.

A UE (such as the UE 116) can determine CSI-RS transmission parameters through DL control signaling or higher layer signaling, such as radio resource control (RRC) signaling, from a gNB (such as the BS 102). Transmission instances of a CSI-RS can be indicated by DL control signaling or be configured by higher layer signaling. A DM-RS is transmitted only in the BW of a respective PDCCH or PDSCH and a UE can use the DM-RS to demodulate data or control information.

Figure 4:
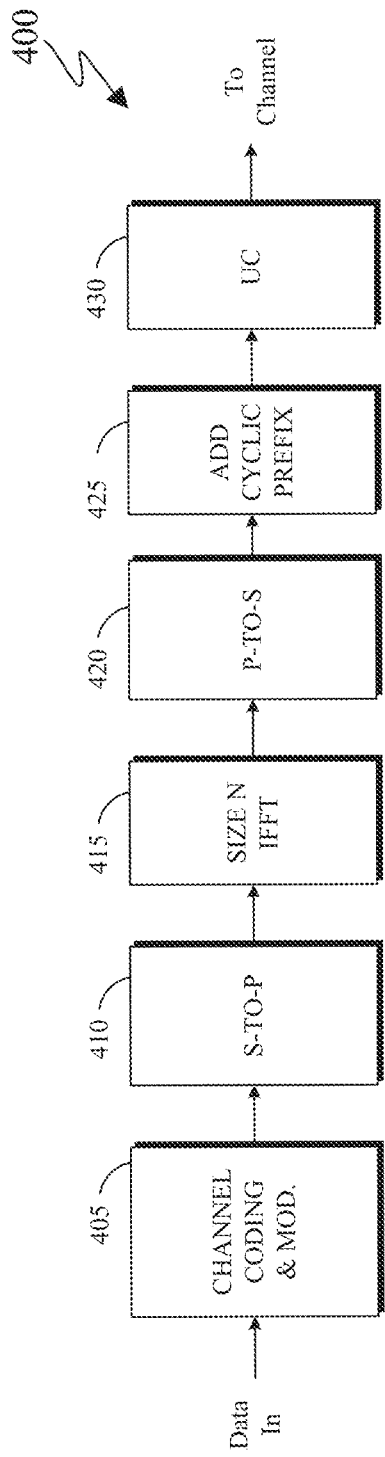
FIGS. 4 and 5 illustrate example wireless transmit and receive paths according to embodiments of the present disclosure.
Figure 5:
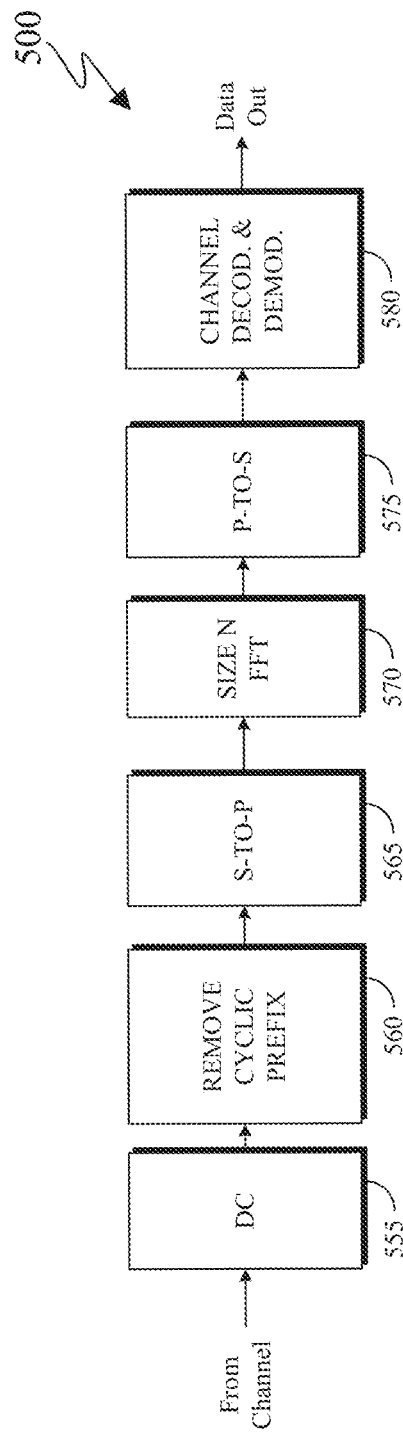

FIG. 4 and FIG. 5 illustrate example wireless transmit and receive paths according to this disclosure. In the following description, a transmit path 400, of FIG. 4, may be described as being implemented in a BS (such as the BS 102), while a receive path 500, of FIG. 5, may be described as being implemented in a UE (such as a UE 116). However, it may be understood that the receive path 500 can be implemented in a BS and that the transmit path 400 can be implemented in a UE. In some embodiments, the receive path 500 is configured to support RA as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols. The serial-to-parallel block 410 converts (such as de-multiplexes) the serial modulated symbols to parallel data in order to generate N parallel symbol streams, where N is the IFFT/FFT size used in the BS 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the BS 102 arrives at the UE 116 after passing through the wireless channel, and reverse operations to those at the BS 102 are performed at the UE 116.

As illustrated in FIG. 5, the down-converter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the BSs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the BSs 101-103 and may implement the receive path 500 for receiving in the downlink from the BSs 101-103.

Each of the components in FIG. 4 and FIG. 5 can be implemented using hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 515 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

In certain embodiments, UL signals also include data signals conveying information content, control signals conveying UL control information (UCI), DM-RS associated with data or UCI demodulation, sounding RS (SRS) enabling a gNB to perform UL channel measurement, and a RA preamble enabling a UE to perform RA (see also NR specification). A UE transmits data information or UCI through a respective PUSCH or a physical UL control channel (PUCCH). A PUSCH or a PUCCH can be transmitted over a variable number of slot symbols including one slot symbol. The gNB can configure the UE to transmit signals on a cell within an active UL bandwidth part (BWP) of the cell UL BW.

UCI includes HARQ acknowledgement (ACK) information, indicating correct or incorrect detection of data transport blocks (TBs) in a PDSCH, scheduling request (SR) indicating whether a UE has data in a buffer, and CSI reports enabling a gNB to select appropriate parameters for PDSCH or PDCCH transmissions to a UE. HARQ-ACK information can be configured to be with a smaller granularity than per TB and can be per data code block (CB) or per group of data CBs where a data TB includes a number of data CBs.

A CSI report from a UE can include a channel quality indicator (CQI) informing a gNB of a largest modulation and coding scheme (MCS) for the UE to detect a data TB with a predetermined block error rate (BLER), such as a 10% BLER (see NR specification), of a precoding matrix indicator (PMI) informing a gNB how to combine signals from multiple transmitter antennas in accordance with a MIMO transmission principle, and of a rank indicator (RI) indicating a transmission rank for a PDSCH.

UL RS includes DM-RS and SRS. DM-RS is transmitted only in a BW of a respective PUSCH or PUCCH transmission. A gNB can use a DM-RS to demodulate information in a respective PUSCH or PUCCH. SRS is transmitted by a UE to provide a gNB with an UL CSI and, for a TDD system, an SRS transmission can also provide a PMI for DL transmission. Additionally, in order to establish synchronization or an initial higher layer connection with a gNB, a UE can transmit a physical random-access channel (PRACH as shown in NR specifications).

An antenna port is defined such that the channel over which a symbol on the antenna port is conveyed can be inferred from the channel over which another symbol on the same antenna port is conveyed.

For DM-RS associated with a PDSCH, the channel over which a PDSCH symbol on one antenna port is conveyed can be inferred from the channel over which a DM-RS symbol on the same antenna port is conveyed only if the two symbols are within the same resource as the scheduled PDSCH, in the same slot, and in the same precoding resource block group (PRG).

For DM-RS associated with a PDCCH, the channel over which a PDCCH symbol on one antenna port is conveyed can be inferred from the channel over which a DM-RS symbol on the same antenna port is conveyed only if the two symbols are within resources for which the UE may assume the same precoding being used.

For DM-RS associated with a physical broadcast channel (PBCH), the channel over which a PBCH symbol on one antenna port is conveyed can be inferred from the channel over which a DM-RS symbol on the same antenna port is conveyed only if the two symbols are within a SS/PBCH block transmitted within the same slot, and with the same block index.

Two antenna ports are said to be quasi co-located if the large-scale properties of the channel over which a symbol on one antenna port is conveyed can be inferred from the channel over which a symbol on the other antenna port is conveyed. The large-scale properties include one or more of delay spread, Doppler spread, Doppler shift, average gain, average delay, and spatial Rx parameters.

The UE (such as the UE 116) may assume that synchronization signal (SS)/PBCH block (also denoted as SSBs) transmitted with the same block index on the same center frequency location are quasi co-located with respect to Doppler spread, Doppler shift, average gain, average delay, delay spread, and, when applicable, spatial Rx parameters. The UE may not assume quasi co-location for any other synchronization signal SS/PBCH block transmissions.

In absence of CSI-RS configuration, and unless otherwise configured, the UE may assume PDSCH DM-RS and SSB to be quasi co-located with respect to Doppler shift, Doppler spread, average delay, delay spread, and, when applicable, spatial Rx parameters. The UE may assume that the PDSCH DM-RS within the same code division multiplexing (CDM) group is quasi co-located with respect to Doppler shift, Doppler spread, average delay, delay spread, and spatial Rx. The UE may also assume that DM-RS ports associated with a PDSCH are QCL with QCL type A, type D (when applicable) and average gain. The UE may further assume that no DM-RS collides with the SS/PBCH block.

The UE can be configured with a list of up to M transmission configuration indication (TCI) State configurations within the higher layer parameter PDSCH-Config to decode PDSCH according to a detected PDCCH with DCI intended for the UE and the given serving cell, where M depends on the UE capability maxNumberConfiguredTCI-statesPerCC. Each TCI-State contains parameters for configuring a quasi-colocation (QCL) relationship between one or two downlink reference signals and the DM-RS ports of the PDSCH, the DM-RS port of PDCCH or the CSI-RS port(s) of a CSI-RS resource.

The quasi co-location relationship is configured by the higher layer parameter qcl-Type1 for the first DL RS, and qcl-Type2 for the second DL RS (if configured). For the case of two DL RSs, the QCL types may not be the same, regardless of whether the references are to the same DL RS or different DL RSs. The quasi co-location types corresponding to each DL RS are given by the higher layer parameter qcl-Type in QCL-Info and may take one of the following values: QCL-TypeA: {Doppler shift, Doppler spread, average delay, delay spread}; QCL-TypeB: {Doppler shift, Doppler spread}; QCL-TypeC: {Doppler shift, average delay}; and QCL-TypeD: {Spatial Rx parameter}.

The UE receives a MAC-CE activation command to map up to [N] (e.g., N=8) TCI states to the codepoints of the DCI field "Transmission Configuration Indication." When the HARQ-ACK corresponding to the PDSCH carrying the activation command is transmitted in slot n, the indicated mapping between TCI states and codepoints of the DCI field "Transmission Configuration Indication" may be applied after a MAC-CE application time, e.g., starting from the first slot that is after slot $(n+3N_{slot}^{subframe,\mu})$.

In certain embodiments, a RA procedure is initiated by on the following methods: RRC (for SI-request)—if SIB 1 includes scheduling info for (on-demand) SI request; MAC; and PDCCH-order.

A RA procedure can be initiated due to at least one of the following triggers/purposes: (i) initial access to establish RRC connection (to go from RRC_IDLE or RRC_INACTIVE to RRC_CONNECTED); (ii) re-establish RRC connection after radio link failure (RLF); (iii) on-demand system information (SI) request; (iv) hand-over; (v) UL synchronization; (ci) scheduling request (SR); (vii) positioning; and (viii) link recovery (also known as beam failure recovery (BFR)).

It is noted that RA can operate in two modes: (i) contention-based random access (CBRA) where UEs within a serving cell can share same RA resources and there is therefore a possibility of collision among RA attempts from different UEs, and (ii) contention-free random access (CFRA) where a UE has dedicated RA resources that are indicated by a serving gNB and may not be shared with other UEs so that RA collisions can be avoided. For example, CBRA may be used for all triggers/purposes mentioned above while CFRA may be used only for triggers/purposes (iv) through (viii) as shown above.

A 4-step RA procedure, also known as a Type-1 (L1) RA procedure, consists of the following steps/operations for a UE: transmission of a PRACH preamble (Msg1); attempting to receive a RA response (RAR or Msg2); transmitting a contention resolution message (Msg3); and attempting to receive a contention resolution message (Msg4).

An alternative RA procedure can be also considered, which is so-called 2-step RACH or a Type-2 L1 RA procedure, where Msg1 and Msg3 are combined into a "MsgA" transmission and Msg2 and Msg4 above are combined into a "MsgB" reception.

Various embodiments of the disclosure involve 4-step RACH, although the embodiments can generally apply to 2-step RACH as well and explicit individual descriptions are typically omitted for brevity.

A PRACH preamble transmission (for both CBRA and CFRA modes) is associated with a DL RS. This association can help a serving gNB (such as the BS 102) to identify an uplink spatial reception filter/beam to receive a PRACH and can also help a UE to identify an uplink spatial transmission filter/beam to transmit a PRACH. For example, a UE can use a same or a related, such as with same QCL properties and/or same direction but narrower width, uplink transmission filter/beam as that used for DL reception of an indicated DL RS for Msg1 transmission. This association can also be used to provide a DL RS resource for pathloss estimation for determining a PRACH preamble transmission power in NR specification.

A DL RS for Msg1 transmission can be one of the following options based on the PRACH scenario: SSB: for BFR, CFRA, PDCCH-order PRACH, SI request, CBRA; or CSI-RS: for BFR, CFRA, CBRA.

It is noted that throughout the disclosure, an SSB is used as a short form for a SS/PBCH block. The terms SSB and SS/PBCH block are interchangeably used in this disclosure.

Furthermore, it is possible for a serving cell to be configured with both SSB and CSI-RS for PRACH transmissions. For example, some PRACH preambles can be associated with an SSB for? QCL determination and some PRACH preambles can be associated with a CSI-RS for QCL determination. It is also possible that a secondary serving cell (SCell) does not have any SSB configuration/transmission and only supports PRACH transmissions from UEs using CSI-RS for QCL determination. Then, as described in the previous paragraph, certain RA triggers/modes such as for PDCCH order for RA or for SI request, are not applicable.

A RACH configuration includes RACH occasions (ROs) in certain RACH slots and certain frequency resource blocks, that repeat with a certain periodicity.

NR uses Zadoff-Chu sequences for the PRACH preambles. There are 3 PRACH long preamble formats with sequence length of 839 with subcarrier spacings of 1.25 or 5 kHz. Long sequences support unrestricted sets and restricted sets of Type A and Type B. For the purpose of beam-sweeping within a RACH occasion, NR uses a new set of PRACH preamble formats of shorter sequence length 139 on 1, 2, 4, 6, and 12 OFDM symbols and sub-carrier spacing (SCS) of 15, 30, 60, and 120 kHz. These are composed of single or consecutive repeated RACH sequences. The cyclic prefix is inserted at the beginning of the preambles. Guard time (GT) may be appended at the end of the preambles, while cyclic prefix (CP) and gap between RACH sequences is omitted. Short sequences support unrestricted sets only. For both short and long PRACH preamble sequences, the network can also conduct beam-sweeping reception between RACH occasions.

Multiple RACH preamble formats are defined for one or more PRACH symbols. Possibly different CP and GT lengths can be used. PRACH preamble configuration is signaled to the UE by RRC. RRC informs the UE of the association between the SSB and RACH resources. The threshold of the SSB for RACH resource association is based on the reference signal received power (RSRP) and configurable by the network. A UE (such as the UE 116) can calculate the PRACH transmit power for the retransmission of the preamble based on the most recent estimate of pathloss and the power ramping counter. If the UE conducts beam switching, the counter for power ramping does not change.

Before a RACH preamble transmission, the physical layer of a UE receives a set of SSB indices and provides the UE RRC sublayer a set of RSRP measurements for SSB candidates with the indices. Information required for the UE physical layer prior to PRACH preamble transmission includes preamble format, time resources, and frequency resources for PRACH transmission as well as parameters for determining root sequences and their cyclic shifts in the PRACH preamble sequence set including index to logical root sequence table, cyclic shift $N_{CS}$, and set type, that is, unrestricted, restricted set A, or restricted set B.

SSB indices are mapped to PRACH occasions in increasing order of preamble indices within a single PRACH occasion, then, in increasing order of frequency resource indices of frequency-multiplexed PRACH occasions, then, in increasing order of time resource indices of time-multiplexed PRACH occasions within a PRACH slot and, finally, in increasing order of indices of PRACH slots. An association period, starting from frame 0, for mapping SSBs to PRACH occasions is a smallest value in a set determined by the PRACH configuration period such that $N_{SSB}$ SS/PBCH blocks are mapped at least once to PRACH occasions within the association period. A UE obtains the parameter $N_{SSB}$ from RRC. If after an integer number of SSB to PRACH occasions mapping cycles within the association period, there is a set of PRACH occasions that are not mapped to $N_{SSB}$ SSBs, no SSBs are mapped to the set of PRACH occasions. An association pattern period includes one or more association periods and is calculated such that a pattern between PRACH occasions and SSBs repeats at most every 160 msec. PRACH occasions that are not associated with SSBs after an integer number of association periods, if any, are not used for PRACH transmissions.

A PRACH preamble transmission can occur within a configurable subset of slots that are referred to as PRACH slots and repeat every PRACH configuration period. There may be multiple PRACH occasions within each PRACH slot in the frequency-domain that cover $N_{RB}^{PRACH-Preamble}$ $N_{PRACH}$ consecutive RBs where $N_{RB}^{PRACH-Preamble}$ is a preamble bandwidth measured in number of RBs, and $N_{PRACH}$ is the number of frequency-domain PRACH occasions.

A next available PRACH occasion from PRACH occasions corresponding to a selected SSB may be further restricted by a parameter ra-ssb-OccasionMaskIndex, if configured or indicated by PDCCH. Otherwise, the UE MAC selects a PRACH occasion randomly with equal probability amongst consecutive PRACH occasions. Measurement gaps when determining a next available PRACH occasion corresponding to a selected SSB are also be accounted for. Similar, parameter ra-OccasionList may restrict PRACH occasion(s) when associated with a CSI-RS where a PRACH preamble may be transmitted.

Figure 6:
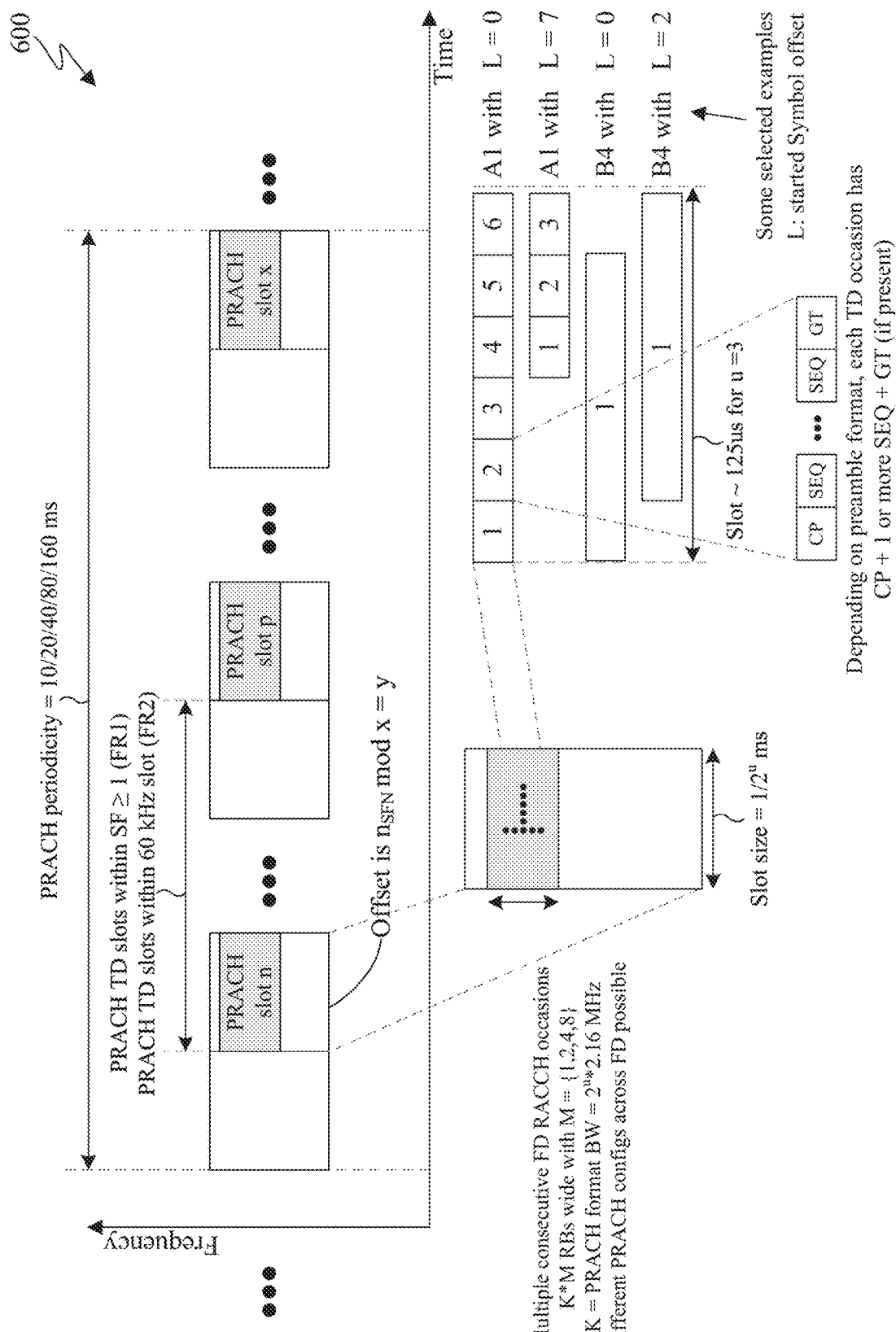
FIG. 6 illustrates an example diagram of a physical random access channel (PRACH) time-domain and frequency-domain allocation according to embodiments of the present disclosure.

FIG. 6 illustrates an example diagram 600 of a PRACH time-domain and frequency-domain allocation and parameter configuration according to embodiments of the disclosure. The diagram 600 is for illustration only and other embodiments can be used without departing from the scope of the present disclosure.

For a given preamble type, corresponding to a certain preamble bandwidth, the overall available time-frequency PRACH resources within a cell can be described by the following parameters: a configurable PRACH periodicity that can range from 10 to 160 msec; a configurable set of PRACH slots within the PRACH period; and a configurable frequency-domain PRACH resource given by the index of the first RB in the resource and the number of frequency-domain PRACH occasions.

In certain embodiments, a UE (such as the UE 116) can transmit PRACH preambles only in time resources that are signaled via RRC parameter prach-ConfigurationIndex and further depend on the frequency range (FR1 or FR2) and the spectrum type. A UE can transmit PRACH preambles only in frequency resources indicated by parameter msg1-FrequencyStart. The PRACH frequency resources $n_{RA} = \{0; 1; \ldots; M-1\}$, in which the parameter M is derived from the RRC parameter msg1-FDM, are numbered in increasing order within an initial active UL bandwidth part during initial access, starting from the lowest frequency.

A UE determines transmission power for PRACH, $P_{PRACH,b,f,c}(i)$, on active UL BWP b of carrier f of serving cell c based on DL RS for serving cell c in transmission occasion i as described in Equation (1), below.

$$P_{PRACH,b,f,c}(i) = \min\{P_{CMAX,f,c}(i), P_{PRACH,target,f,c} + PL_{b,f,c}\} [dBm] \qquad (1)$$

As described in Equation (1), $P_{CMAX,f,c}(i)$ is the UE configured maximum output power for carrier f of serving cell c within transmission occasion i. Additionally, $P_{PRACH,target,f,c}$ is the PRACH target reception power PREAMBLE_RECEIVED_TARGET_POWER provided by higher layers for the active UL BWP b of carrier f of serving cell c. Moreover, $PL_{b,f,c}$ is a pathloss for the active UL BWP b of carrier f based on the DL RS associated with the PRACH transmission on the active DL BWP of serving cell c and calculated by the UE in dB as (referenceSignalPower—higher layer filtered RSRP) in dBm and the higher layer filter configuration is defined in RRC.

If a PRACH transmission from a UE is not in response to a detection of a PDCCH order by the UE or is in response to a detection of a PDCCH order by the UE that triggers a contention based RA procedure or is associated with a link recovery procedure where a corresponding index $q_{new}$ is associated with an SSB, referenceSignalPower is provided by ss-PBCH-BlockPower.

If a PRACH transmission from a UE is in response to a detection of a PDCCH order by the UE that triggers a contention-free RA procedure and depending on the DL RS that the DM-RS of the PDCCH order is quasi-collocated with, referenceSignalPower is provided by ss-PBCH-BlockPower or, if the UE is configured resources for a periodic CSI-RS reception or the PRACH transmission is associated with a link recovery procedure where a corresponding index $q_{new}$ is associated with a periodic CSI-RS configuration, referenceSignalPower is obtained by ss-PBCH-BlockPower and powerControlOffsetSS where powerControlOffsetSS provides an offset of CSI-RS transmission power relative to SSB transmission power. If powerControlOffsetSS is not provided to the UE, the UE assumes an offset of 0 dB.

Following RACH preamble transmission, if within a RA response window of RRC signaled and configurable size ra-ResponseWindow, the UE does not receive a RA response that contains a RA preamble identifier (RAPID) corresponding to the preamble sequence transmitted by the UE, the UE typically increases (in steps) a transmission power up to a certain limit, such as one defined by a maximum transmission power, using a power ramping counter for a subsequent PRACH transmission. If prior to a PRACH retransmission, the UE changes a spatial domain transmission filter, the UE physical layer notifies the higher layers to suspend the power ramping counter.

For every PRACH preamble re-transmission attempt, the UE increases the PREAMBLE_TRANSMISSION_COUNTER by 1 and applies an adjustment value DELTA_PREAMBLE to determine a transmission power for a subsequent PRACH transmission, as escribed in Equation (2), below.

PREAMBLE_RECEIVED_TARGET_POWER=preamble-ReceivedTargetPower+DELTA_PREAMBLE+(PREAMBLE_POWER_RAMPING_COUNTER−1)×PREAMBLE_POWER_RAMPING_STEP (2)

The expression, PREAMBLE_POWER_RAMPING_STEP is set to higher layer parameter powerRampingStep for a 4-step RACH procedure. PREAMBLE_POWER_RAMPING_STEP can be set separately for the case of a 2-step RACH procedure using the higher layer signaled parameter msgA-PreamblePowerRampingStep, and for the case that ra-Prioritization is configured using the signaled parameter powerRampingStepHighPriority.

The value of the adjustment step DELTA_PREAMBLE depends on the preamble format and SCS as shown in Table (1) and Table (2). Here, $\mu$ is the SCS configuration determined by msg1-SubcarrierSpacing (4-step RACH) or msgA-SubcarrierSpacing (2-step RACH) and the preamble formats are given by prach-ConfigurationIndex or msgA-PRACH-ConfigurationIndex. Table (1) and Table (2) describe DELTA_PREAMBLE values for short preamble formats.

TABLE 1

| Preamble Format | DELTA_PREAMBLE values |
|---|---|
| 0 | 0 dB |
| 1 | −3 dB |
| 2 | −6 dB |
| 3 | 0 dB |

TABLE 2

| Preamble Format | DELTA_PREAMBLE values (dB) |
|---|---|
| A1 | $8 + 3 \times \mu$ |
| A2 | $5 + 3 \times \mu$ |
| A3 | $3 + 3 \times \mu$ |
| B1 | $8 + 3 \times \mu$ |
| B2 | $5 + 3 \times \mu$ |
| B3 | $3 + 3 \times \mu$ |
| B4 | $3 \times \mu$ |
| C0 | $11 + 3 \times \mu$ |
| C2 | $5 + 3 \times \mu$ |

After a UE transmits a PRACH preamble (Msg1), there are three more steps for a (4-step) RA procedure for the UE: reception of a RA response (RAR or Msg2) from the gNB; transmission of a contention resolution message to the gNB (Msg3); and reception of a contention resolution response message (Msg4) from the gNB.

RA response (RAR or Msg2) is a PDCCH/PDSCH reception on a DL BWP of a PCell/SpCell, as described below, that is the initial DL BWP (for the case of initial access, i.e., (re-)establishing RRC connection), or the active DL BWP (with same BWP-index as the active UL BWP) (for other RA triggers except for initial access). If the active DL BWP index is not same as active UL BWP index, the UE changes the active DL BWP to one with same BWP index as the active UL BWP.

The SCS for a PDCCH reception scheduling a PDSCH with a RAR message is the SCS of a Type1-PDCCH common search space (CSS) set as described in REF 3. The SCS for any subsequent PDCCH/PDSCH reception is also same as the SCS for the PDCCH/PDSCH providing the RAR unless the UE is configured a different SCS.

A UE (such as the UE 116) monitors PDCCH for detection of a DCI format 1_0 scheduling a PDSCH providing a RAR during a configured time window according to the Type1-PDCCH CSS set of the PCell/SpCell identified by a RA radio network temporary identifier (RA-RNTI) (or, for the case of beam failure recovery (BFR) with CFRA, in the search space indicated by recoverySearchSpaceId of the PCell/SpCell identified by the cell-radio network temporary identifier (C-RNTI)).

A RAR includes information for one or more UEs, wherein some of the information is common to UEs and remaining information is UE-specific.

In one example, a RAR includes a 4-bit backoff indicator (BI) that indicates a maximum back-off time needed before a next PRACH transmission attempt by a UE. The UE selects an actual back-off time uniformly at random between zero and the value indicated by the BI field. The BI is typically used to control loading of PRACH preamble transmissions on the serving cell.

In another example, a RAR includes a RAPID, such as by a 6-bit field, that indicates an ID of a preamble that a UE transmitted and is a response to a system information (SI) request by the UE.

In another example, a gNB sends a RAPID together with a MAC payload (MAC RAR), that includes a timing advance (TA) command, an uplink grant for scheduling a Msg3 PUSCH, and a temporary C-RNTI (TC-RNTI).

Figure 7:
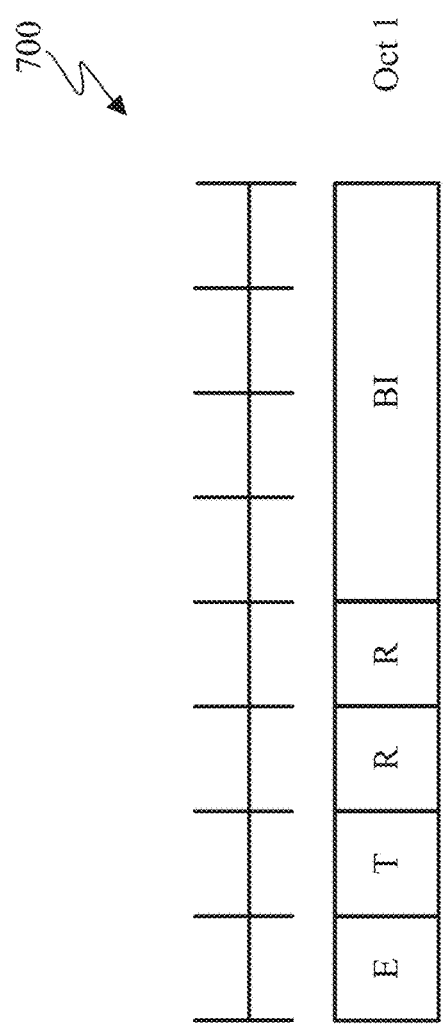
FIG. 7 illustrates an example diagram of a E/T/R/R/BI medium access control (MAC) sub-header according to embodiments of the present disclosure.
Figure 8:
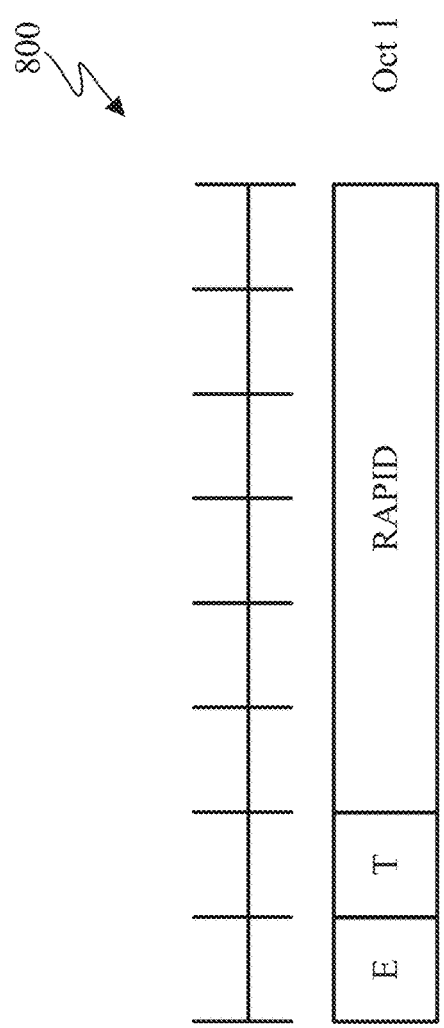
FIG. 8 illustrates an example diagram of a E/T/RAPID MAC sub-header according to embodiments of the present disclosure.
Figure 9:
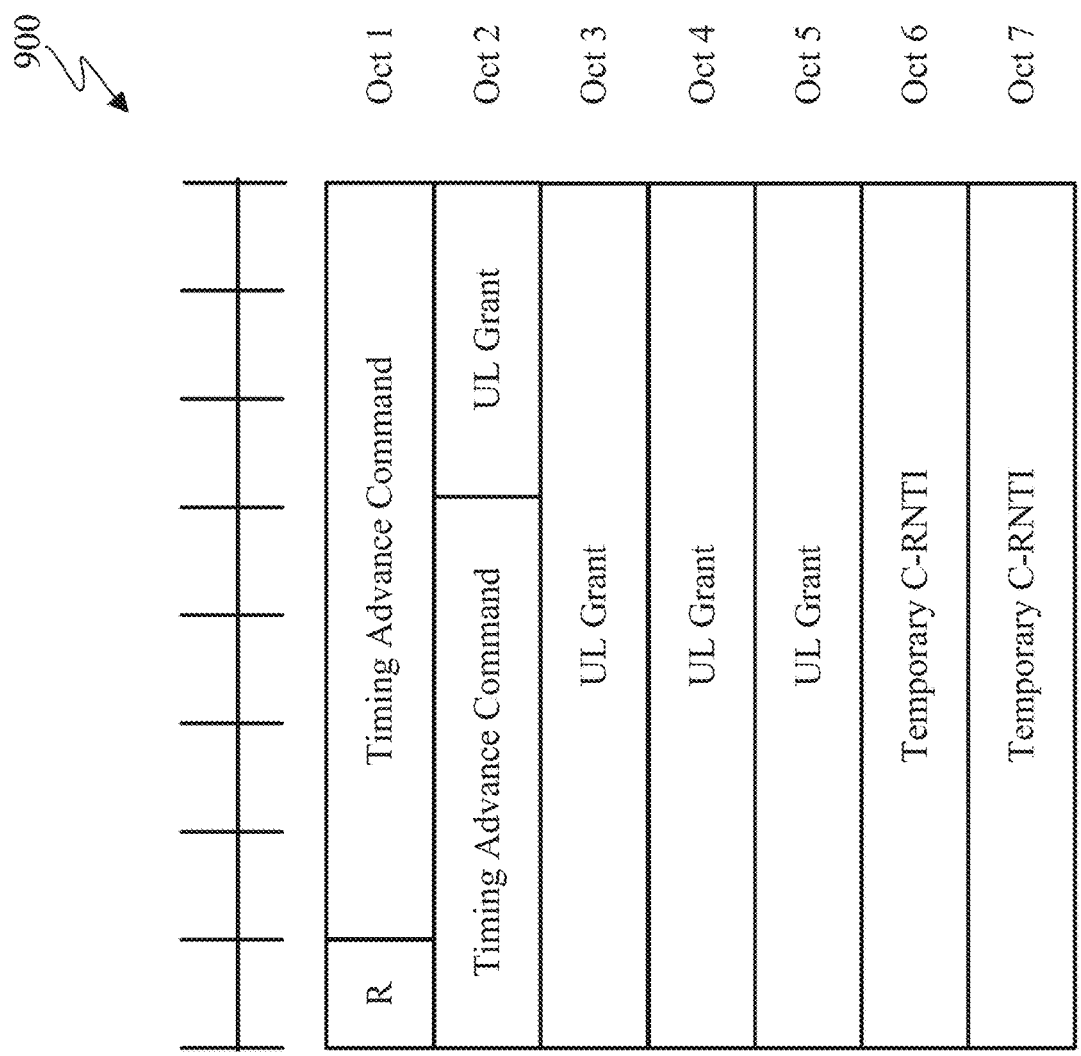
FIG. 9 illustrates an example diagram of a MAC random access response (RAR) according to embodiments of the present disclosure.

FIG. 7 illustrates an example diagram 700 of a E/T/R/R/BI MAC sub header 600 according to embodiments of the disclosure. FIG. 8 illustrates an example diagram 800 of an example E/T/RAPID MAC sub header 650 according to embodiments of the disclosure. FIG. 9 illustrates an example diagram 900 of a MAC RAR 670 according to embodiments of the disclosure. The diagram 700 of FIG. 7, the diagram 800 of FIG. 8 and the diagram 900 of FIG. 9 are for illustration only and other embodiments can be used without departing from the scope of the present disclosure.

One or more of the components illustrated in FIGS. 7, 8, and 9 can be implemented in specialized circuitry configured to perform the noted functions or one or more of the components can be implemented by one or more processors executing instructions to perform the noted functions. Other embodiments are used without departing from the scope of the disclosure.

Table (3) includes exemplary RA response grant content fields and corresponding sizes. In particular, Table (3) describes MAC RAR grant field size.

TABLE 3

| RAR grant field | Number of bits |
|---|---|
| Frequency hopping flag | 1 |
| PUSCH frequency resource allocation | 14 |
| PUSCH time resource allocation | 4 |
| MCS | 4 |
| TPC command for PUSCH | 3 |
| CSI request | 1 |
| Total number of bits | 27 |

For CFRA-based BFR, a UE (such as the UE 116) considers a RAR reception to be successful when the UE receives a PDSCH that scheduled by a DCI format with cyclic redundancy check (CRC) scrambled by the C-RNTI for the UE that is provided by a PDCCH reception according to an indicated search space set.

For other cases (such as CBRA and SI request), RAR is successful for a UE when the UE: (i) receives a PDCCH, according to a Type1-PDCCH CSS set of the SpCell during a configured time window, that provides a DCI format addressed to the RA-RNTI; and (ii) correctly decodes a transport block in a PDSCH scheduled by the DCI format; and (iii) obtains a same RAPID from the MAC RAR in the PDSCH as the RAPID for a transmitted PRACH preamble in Msg1. Then, the UE, for the serving cell where the UE transmitted PRACH preamble (Msg1) applies the TA to adjust a timing between transmissions and receptions, stores a TC-RNTI provided by the MAC RAR for use in future transmissions/receptions, and processes the RAR UL grant to transmit Msg3 PUSCH.

If RAR reception by a UE is not successful, the UE attempts (possibly after a back-off and/or UE processing time up to $N_{T,1}+0.75$ msec as described in REF 3) a new PRACH preamble transmission with PRACH resource selection (possibly including a different SSB and/or a different preamble), and possibly by applying PRACH preamble power ramping, unless the UE has reached a configured maximum number of PRACH attempts and then the UE reports a RA problem to higher layers and stops the RA procedure.

The resource allocation for Msg3 PUSCH (as indicated by the RAR UL grant) includes the following fields from Table 1: a frequency hopping flag; a PUSCH time resource allocation; and a PUSCH frequency resource allocation.

The time resource allocation field indicates a starting symbol and time-domain length of the Msg3 PUSCH transmission.

The frequency domain resource allocation field is for uplink resource allocation type 1 and indicates allocations of consecutive (virtual) resource blocks as described in REF 3.

It is noted that as used herein, the terms "4-step RA", "type-1 RA procedure" and "type-1 L1 RA procedure" are used interchangeably. Also, the terms "2-step RA", "type-2 RA procedure" and "type-2 L1 RA procedure" are used interchangeably.

Prior to initiation of a physical RA procedure by a UE, layer 1 of the UE receives from higher layers an indication to perform a type-1 RA procedure (4-step RA) or a type-2 RA procedure (2-step RA).

From the physical layer perspective, the type-2 L1 RA procedure includes transmission of a RA preamble in a PRACH and of a PUSCH (MsgA), and the reception of a RAR message with a PDCCH/PDSCH (MsgB). When a RAR for a 2-step RA procedure indicates fall-back to 4-step RA (namely, a fallbackRAR), a 2-step RA procedure continues similar to a 4-step RA procedure, namely, a PUSCH transmission scheduled by a RAR UL grant, and a PDSCH reception for contention resolution.

PRACH preambles for a 2-step RA are separate from PRACH preambles for 4-step RA, for example, R contention-based preambles per SS/PBCH block per valid PRACH occasion for a 2-step RA procedure start after the ones for a 4-step RA procedure.

In certain embodiments, ROs for a 2-step RA procedure can be common/shared with or can be separate from ROs for a 4-step RA procedure.

In response to a transmission of a PRACH and a PUSCH, a UE attempts to detect a DCI format 1_0 with CRC scrambled by a corresponding RA-RNTI/MsgB-RNTI during a window controlled by higher layers, for example as described in REF 3 and REF 4. The window starts at a first symbol of an earliest CORESET the UE is configured to receive PDCCH according to Type1-PDCCH CSS set, for example as described in REF 3, that is at least one symbol after a last symbol of a PUSCH occasion corresponding to a PUSCH transmission (associated with a 2-step RA procedure), where the symbol duration corresponds to the SCS for the Type1-PDCCH CSS set. The length of the window in number of slots, based on the SCS for Type1-PDCCH CSS set, is provided by ra-ResponseWindow (as used for 4-step RA procedure) or a separate configuration can be provided for a time window length of a 2-step RA procedure.

If the UE detects the DCI format 1_0 with CRC scrambled by the corresponding RA-RNTI/MsgB-RNTI, and a transport block in a corresponding PDSCH within the window, the UE passes the transport block to higher layers.

The higher layers indicate to the physical layer one of (a) an uplink grant when the RAR message(s) is for fallback-RAR and a RAPID associated with the PRACH transmission is identified, and the UE procedure continues as in a 4-step RA procedure when the UE detects a RAR UL grant, or (b) an ACK to be provided in a PUCCH transmission when the RAR message(s) is for successRAR. When the UE transmits a PUCCH that provides an ACK, a PUCCH resource for the PUCCH transmission is indicated by a PUCCH resource indicator (PRI) field of 4 bits in the successRAR from a PUCCH resource set that is provided by pucch-ResourceCommon; a slot for the PUCCH transmission is indicated by a PDSCH-to-HARQ feedback timing indicator field of 3 bits in the successRAR having a value k from {1, 2, 3, 4, 5, 6, 7, 8} and, with reference to slots for PUCCH transmission having duration $T_{slot}$, the slot is determined as $ceil(n+k+\Delta+t_A/T_{slot})$ where n is a slot of the PDSCH reception, $\Delta$ is for example as defined for PUSCH transmission in REF 3 or per a different table provided in the system specifications, and $t_A \geq 0$. The UE does not expect a first symbol of the PUCCH transmission to be after a last symbol of the PDSCH reception by a time smaller than $N_{T,1}+0.5+t_A$ msec where $N_{T,1}$ is a PDSCH processing time for UE processing capability 1 as described in REF 4. The PUCCH transmission is with a same spatial domain transmission filter and in a same active UL BWP as a last PUSCH transmission.

If the UE detects the DCI format 1_0 with CRC scrambled by a C-RNTI and a transport block in a corresponding PDSCH within the window, the UE transmits a PUCCH with HARQ-ACK information having ACK value when the UE correctly detects the transport block or having negative acknowledgement (NACK) value when the UE incorrectly detects the transport block, and the time alignment timer is running.

The UE does not expect to be indicated to transmit the PUCCH with the HARQ-ACK information at a time that is prior to a time when the UE applies a TA command that is provided by the transport block.

If the UE does not detect the DCI format 1_0 with CRC scrambled by the corresponding RA-RNTI/MsgB-RNTI within the window, or if the UE does not correctly receive the transport block in the corresponding PDSCH within the window, or if the higher layers do not identify the RAPID associated with the PRACH transmission from the UE, the higher layers can indicate to the physical layer to perform a Type-1 RA procedure or to perform a Type-2 RA procedure.

If requested by higher layers, the UE is expected to transmit a PRACH no later than $N_{T,1}+0.75$ msec after the last symbol of the window, or the last symbol of the PDSCH reception, where $N_{T,1}$ is a time duration of $N_1$ symbols corresponding to a PDSCH processing time for UE processing capability 1 when additional PDSCH DM-RS is configured. For $\mu=0$, the UE assumes $N_{1,0}=14$ as described in REF 3 and REF 4.

For contention-free RA (CFRA), as well as for SI request, a correct reception of Msg2/RAR is the last step for a RA procedure. However, for contention-based RA (CBRA), it is likely that multiple UEs may have used a same preamble and further steps are needed to resolve the contention. Furthermore, for RA before RRC_CONNECTED state, such as for initial access, a UE and a gNB need to exchange further information to set up the connection and an Msg3 PUSCH transmission is needed for contention resolution request and possibly also for connection setup request, and a Msg4 PDSCH transmission is needed for contention resolution response and possibly for connection setup response. The contention resolution (and connection set up, if applicable) is considered successful if the UE receives Msg4 PDSCH within a certain time window after transmission of Msg3 and, when the UE has not received a C-RNTI, also if the contention resolution ID in Msg4 PDSCH matches the ID that the UE transmitted in Msg3 PUSCH. Otherwise, the contention resolution Msg3/4, and therefore the RA attempt, are unsuccessful. The UE can make another RA attempt unless the configured maximum number of RA attempts has been reached and then the entire RA procedure is declared as unsuccessful.

Upon failure of a RA attempt (due to either no RAR reception, no match for RAPID in RAR with that in Msg1, or failure of contention resolution Msg3/4), a UE may perform a new RACH resource selection for a new RA attempt, including selection of a DL RS associated with a PRACH transmission, selection of the PRACH preamble, and selection of the RO. Therefore, it is possible that a different SSB/CSI-RS, and/or a different PRACH preamble, and/or a different RO are used for the PRACH transmission of the new RA attempt compared to the previous RA attempt. However, power ramping is only applied if the same DL RS is used in the PRACH transmissions of the new RA attempt and of the previous RA attempt.

In the following and throughout the disclosure, various embodiments of the disclosure may be also implemented in any type of UE including, for example, UEs with the same, similar, or more capabilities compared to legacy 5G NR UEs. Although various embodiments of the disclosure discuss 3GPP 5G NR communication systems, the embodiments may apply in general to UEs operating with other RATs and/or standards, such as next releases/generations of 3GPP, IEEE WiFi, and so on.

In the following, unless otherwise explicitly noted, providing a parameter value by higher layers includes providing the parameter value by a system information block (SIB), such as a SIB1, or by a common RRC signaling, or by UE-specific RRC signaling.

In the following, an association between a DL RS, such as a SS/PBCH block (SSB) or a CSI-RS, and a PRACH preamble is with respect to a path-loss determination for computing a power for the PRACH preamble transmission and with respect to QCL properties or a transmission configuration indicator (TCI) state, as described in REF 3.

In certain embodiments, 5G NR radio supports time-division duplex (TDD) operation and frequency division duplex (FDD) operation. Use of FDD or TDD depends on the NR frequency band and per-country allocations. TDD is required in most bands above 2.5 GHz.

Figure 10:
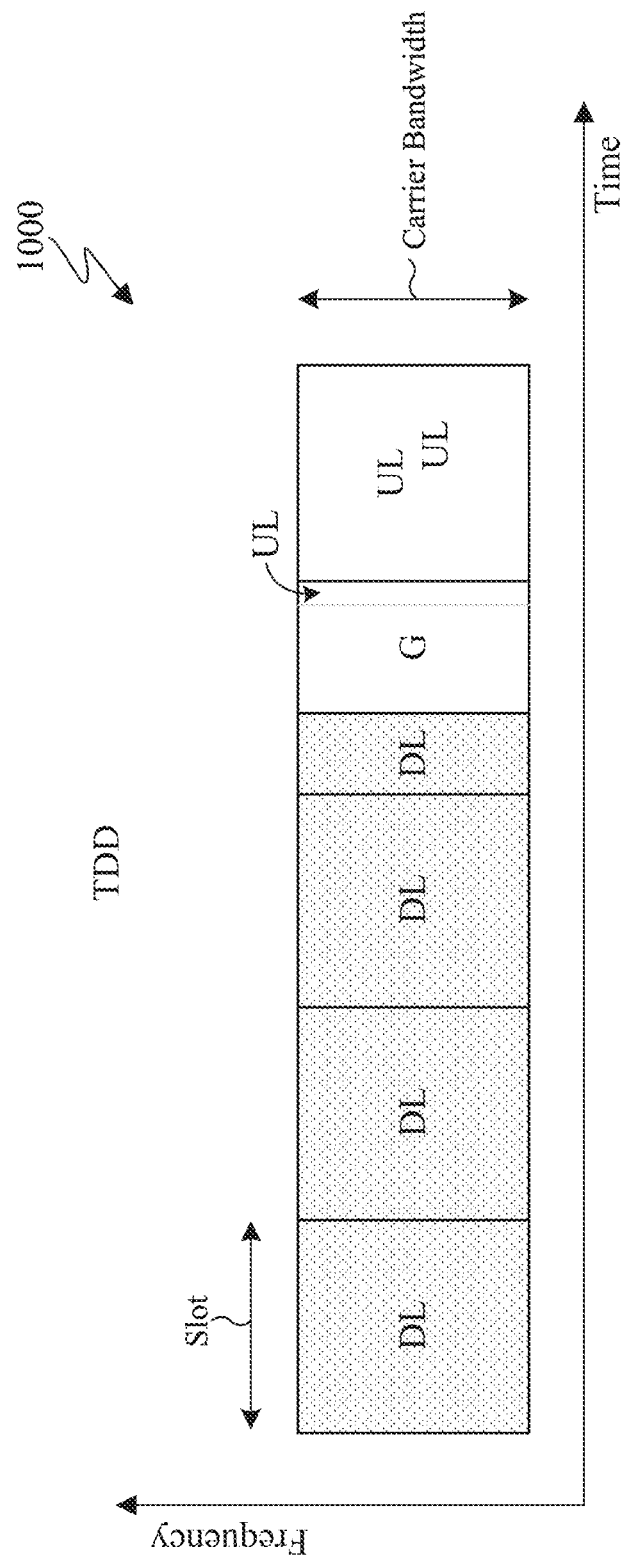
FIG. 10 illustrates an example diagram of a time division duplexing (TDD) communication system according to embodiments of the present disclosure.

FIG. 10 illustrates an example diagram 1000 of structure of slots for a TDD communications system according to the embodiments of the disclosure. The diagram 1000 is for illustration only and other embodiments can be used without departing from the scope of the present disclosure.

A DDDSU UL-DL configuration is shown in FIG. 10. Here, D denotes a DL slot, U denotes an UL slot, and S denotes a special or switching slot with a DL part, a flexible part that can also be used as guard period G for DL-to-UL switching, and optionally an UL part.

TDD has a number of advantages over FDD. For example, use of the same band for DL and UL transmissions leads to simpler UE implementation with TDD because a duplexer is not required. Another advantage is that time resources can be flexibly assigned to UL and DL considering an asymmetric ratio of traffic in both directions. DL is typically assigned most time resources in TDD to handle DL-heavy mobile traffic. Another advantage is that CSI can be more easily acquired via channel reciprocity. This reduces an overhead associated with CSI reports especially when there is a large number of antennas.

Although there are advantages of TDD over FDD, there are also disadvantages. A first disadvantage is a smaller coverage of TDD due to the usually small portion of time resources available for UL transmissions, while with FDD all time resources can be used for UL transmissions. Another disadvantage is latency. In TDD, a timing gap between DL reception and UL transmission containing the hybrid automatic repeat request acknowledgement (HARQ-ACK) information associated with DL receptions is typically larger than that in FDD, for example by several milliseconds. Therefore, the HARQ round trip time in TDD is typically longer than that with FDD, especially when the DL traffic load is high. This causes increased UL user plane latency in TDD and can cause data throughput loss or even HARQ stalling when a PUCCH providing HARQ-ACK information needs to be transmitted with repetitions in order to improve coverage (an alternative in such case is for a network to forgo HARQ-ACK information at least for some transport blocks in the DL).

To address some of the disadvantages for TDD operation, a dynamic adaptation of link direction has been considered where, with the exception of some symbols in some slots supporting predetermined transmissions such as for SSBs, symbols of a slot can have a flexible direction (UL or DL) that a UE can determine according to scheduling information for transmissions or receptions. A PDCCH can also be used to provide a DCI format, such as a DCI format 2_0 as described in REF 3, that can indicate a link direction of some flexible symbols in one or more slots. Nevertheless, in actual deployments, it is difficult for a gNB scheduler to adapt a transmission direction of symbols without coordination with other gNB schedulers in the network. This is because of CLI where, for example, DL receptions in a cell by a UE can experience large interference from UL transmissions in the same or neighboring cells from other UEs.

FD communications offer a potential for increased spectral efficiency, improved capacity, and reduced latency in wireless networks. When using FD communications, UL and DL signals are simultaneously received and transmitted on fully or partially overlapping, or adjacent, frequency resources, thereby improving spectral efficiency and reducing latency in user and/or control planes.

There are several options for operating a FD wireless communication system. For example, a single carrier may be used such that transmissions and receptions are scheduled on same time-domain resources, such as symbols or slots. Transmissions and receptions on same symbols or slots may be separated in frequency, for example by being placed in non-overlapping sub-bands. An UL frequency sub-band, in time-domain resources that also include DL frequency sub-bands, may be located in the center of a carrier, or at the edge of the carrier, or at a selected frequency-domain position of the carrier. The allocations of DL sub-bands and UL sub-bands may also partially or even fully overlap. A gNB may simultaneously transmit and receive in time-domain resources using same physical antennas, antenna ports, antenna panels and transmitter-receiver units (TRX). Transmission and reception in FD may also occur using separate physical antennas, ports, panels, or TRXs. Antennas, ports, panels, or TRXs may also be partially reused, or only respective subsets can be active for transmissions and receptions when FD communication is enabled.

Instead of using a single carrier, it is also possible to use different component carriers (CCs) for receptions and transmissions by a UE. For example, receptions by a UE can occur on a first CC and transmissions by the UE occur on a second CC having a small, including zero, frequency separation from the first CC.

Furthermore, a gNB can operate with FD mode even when a UE still operates in half-duplex mode, such as when the UE can either transmit and receive at a same time, or the UE can also be capable for FD operation.

FD transmission/reception is not limited to gNBs, TRPs, or UEs, but can also be used for other types of wireless nodes such as relay or repeater nodes.

Full duplex operation needs to overcome several challenges in order to be functional in actual deployments. When using overlapping frequency resources, received signals are subject to co-channel CLI and self-interference. CLI and self-interference cancellation methods include passive methods that rely on isolation between transmit and receive antennas, active methods that utilize RF or digital signal processing, and hybrid methods that use a combination of active and passive methods. Filtering and interference cancellation may be implemented in RF, baseband (BB), or in both RF and BB. While mitigating co-channel CLI may require large complexity at a receiver, it is feasible within current technological limits. Another aspect of FD operation is the mitigation of adjacent channel CLI because in several cellular band allocations, different operators have adjacent spectrum.

Throughout the disclosure, Cross-Division-Duplex (XDD) is used as a short form for a FD operation. The terms XDD and FD are interchangeably used in the disclosure.

FD operation in NR can improve spectral efficiency, link robustness, capacity, and latency of UL transmissions. In an NR TDD system, UL transmissions are limited by fewer available transmission opportunities than DL receptions. For example, for NR TDD with SCS=30 kHz, DDDU (2 msec), DDDDSU (2.5 msec), or DDDDDDDSUU (5 msec), the UL-DL configurations allow for an DL:UL ratio from 3:1 to 4:1. Any UL transmission can only occur in a limited number of UL slots, for example every 2, 2.5, or 5 msec, respectively.

Figure 11:
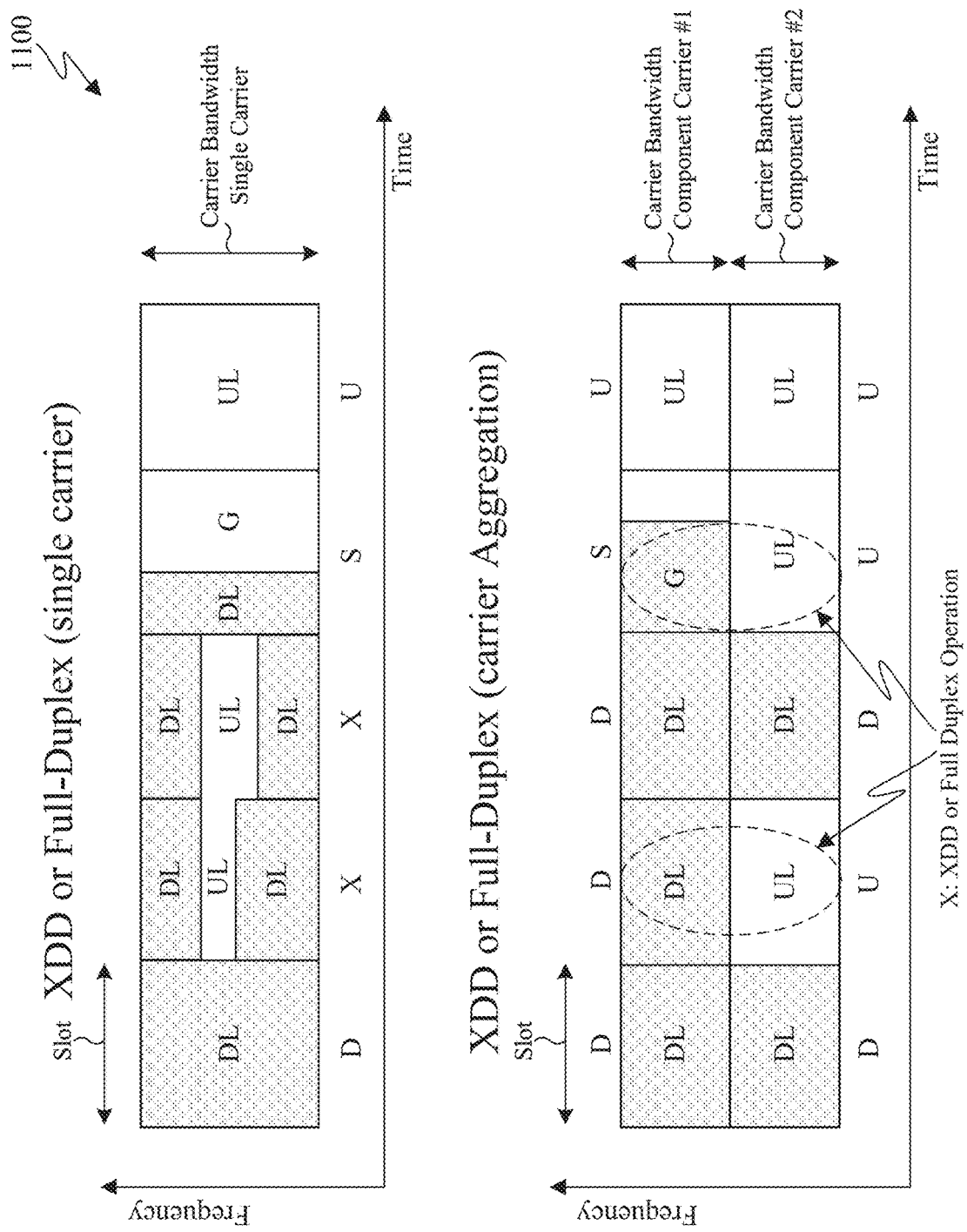
FIG. 11 illustrates an example diagram of two example FD communication system configurations according to the embodiments of the present disclosure.

FIG. 11 illustrates two example FD configurations according to embodiments of the disclosure. The diagram 1100 is for illustration only and other embodiments can be used without departing from the scope of the present disclosure.

For a single carrier TDD configuration with FD enabled, slots denoted as X are FD or XDD slots. Both DL and UL transmissions can be scheduled in XDD slots for at least one or more symbols. The term XDD slot is used to refer to a slot where UEs can simultaneously both receive and transmit in at least one or more symbols of the slot if scheduled or assigned radio resources by the base station. A half-duplex UE cannot both transmit and receive simultaneously in an XDD slot or on a symbol(s) of an XDD slot. When a half-duplex UE is configured for transmission in symbols of an XDD slot, another UE can be configured for reception in the symbols of the XDD slot. A FD UE can transmit and receive simultaneously in symbols of an XDD slot, possibly in presence of other UEs scheduled or assigned resources for either DL or UL in the symbols of the XDD slot. Transmissions by a UE in a first XDD slot can use same or different frequency-domain resources than in a second XDD slot, wherein the resources can differ in bandwidth, a first RB, or a location of the center carrier.

For a dual-carrier (carrier aggregation) TDD configuration with FD enabled, a UE receives in a slot on CC #1 and transmits in at least one or more symbol(s) of the slot on CC #2. In addition to D slots used only for transmissions/receptions by a gNB/UE, U slots used only for receptions/transmissions by the gNB/UE, and S slots for also supporting DL-UL switching, FD slots with both transmissions/receptions by a gNB or a UE that occur on same time-domain resources, such as slots or symbols, are labeled by X. For the example of TDD with SCS=30 kHz, single carrier, and UL-DL allocation DXXSU (2.5 msec), the second and third slots allow for FD operation. UL transmissions can also occur in a last slot (U) where the full UL transmission bandwidth is available. XDD slots or symbol assignments over a time period/number of slots can be indicated by a DCI format in a PDCCH reception and can then vary per unit of the time period, or can be indicated by higher layer signaling, such as via a MAC CE or RRC.

Although FIGS. 6-11 illustrates diagrams, various changes may be made to the diagrams 600-1100 of FIGS. 6-11. For example, while certain diagrams (such as diagrams 700, 800, and 900) describe sub headers and other diagrams (such as diagram 1000) describe a certain slot structure, various components combined, further subdivided, or omitted and additional components can be added according to particular needs.

Embodiments of the present disclosure take into consideration that a robust network operation requires that UEs are able to establish a connection to the network over a large coverage area without consuming a large amount of resources and without requiring large latency to establish the connection. Therefore, embodiments of the present disclosure take into consideration that there is a need to increase a signal to interference and noise ratio (SINR) for PRACH receptions at a gNB in order to increase PRACH coverage. Embodiments of the present disclosure also take into consideration that there is a need to dimension PRACH capacity in a cell area to achieve a target collision probability for PRACH transmissions from UEs for an expected number of concurrent multiple access attempts by UEs. Embodiments of the present disclosure further take into consideration that there is a need to reduce a delay incurred during a RA procedure due to UL-DL frame alignment delay that represents a delay until a next PRACH transmission opportunity occurs.

When considering that multiple channels and signals need to be transmitted by UEs, PRACH transmissions require several operational restrictions. RBs in UL slots or symbols fully or partially occupied by transmissions of PRACH preambles cannot be typically used for other transmissions, such as for PUSCH. For example, in NR, transmissions of short PRACH preambles prevent M*12 RBs per RO in frequency division multiplexing (FDM) from being used for PUSCH transmissions. Long preambles occupy M*6 or M*24 RBs for 15 kHz SCS, and M*3 or M*12 RBs for 30 kHz SCS, where M=1 . . . 8. A first consequence is a reduction in an absolute number of schedulable UL RBs in an UL slot (U) and a corresponding reduction in UL peak data rates. A second consequence is that, depending on a placement of RACH opportunities (RO) in a carrier bandwidth, a PUSCH transmission cannot be allocated a large contiguous BW. In NR Rel-15, UEs are mandated to support only UL resource allocation type 1 that requires frequency-contiguous PUSCH allocations. Therefore, a PUSCH frequency allocation can only be either completely below or completely above the PRACH allocation BW and PUSCH cannot be scheduled in frequency across the ROs. Even if a UE implementation complexity is increased to support UL resource allocation type 0 using resource block group (RBG) based allocations, additional power back-off of up to several dBs is required for corresponding PUSCH transmissions. This results in substantial data rate reductions due to a lower SINR operating point.

Various Embodiments of the present disclosure addresses the above issues by enabling PRACH transmission in FD time-domain resources, such as in slots or symbols supporting simultaneous receptions and transmissions by a UE or by a gNB.

Figure 12:
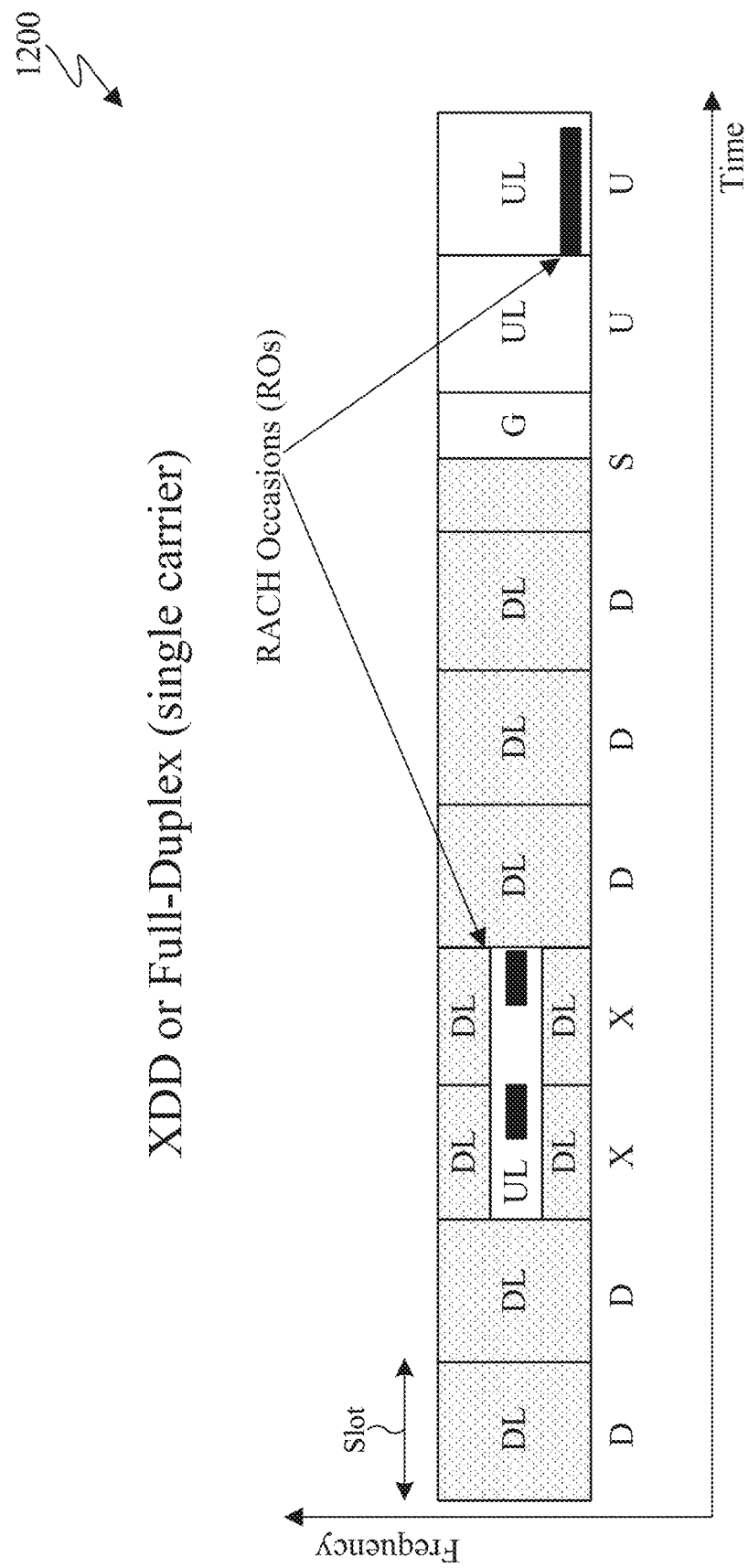
FIG. 12 illustrates an example diagram of a RACH configurations in a FD communication system according to the embodiments of the present disclosure.

FIG. 12 illustrates an example diagram 1200 of a RACH configuration using XDD according to embodiments of the disclosure. The diagram 1200 is for illustration only and other embodiments can be used without departing from the scope of the present disclosure.

PRACH preamble transmissions are configured in the third and fourth XDD slot in addition to the last UL slot (U), as illustrated in FIG. 12. Generally, transmissions related to an RA procedure, including some or all of Msg1 through Msg4 and possible repetitions, may be enabled in symbols of XDD slot(s). A first PRACH transmission in an XDD slot may be followed by a second PRACH transmission in an UL slot (U), or the reverse.

A first motivation for fully or partially placing PRACH transmissions in XDD slots is to increase a data rate in U slots because an absolute number of schedulable RBs is increased and a large number of contiguous RBs can be allocated to a UE by removing RBs allocated to PRACH preambles. A second motivation is a capability to have larger contiguous RB allocations for PRACH transmissions. For TDD and SCS=30 kHz, only short PRACH preamble formats can be used when a single UL slot (U) is available. Longer PRACH preamble formats necessarily require more than one slot. By allowing PRACH transmissions in N consecutive slots that include XDD slots and can also include UL slots, such as N=2 or N=4 slots, long PRACH preamble formats can be used, thereby increasing a range and achievable accuracy of timing estimation for PRACH receptions. A third motivation is a reduced base station complexity. When one or more UEs transmit respective PUSCHs in an XDD slot, interference cancellation from DL signals needs to be designed for reception of UL signals that can have substantially different transmission bandwidth or MCS settings, such as for receptions of PUSCHs from different UEs that can be at different power levels at the base station receiver or use different MCS for corresponding transport blocks. Transmission of PRACH preambles in an XDD slot only requires a base station to perform interference cancellation based on one specific signal type, such as a Zadoff-Chu sequence used as PRACH preamble, thereby simplifying implementation of interference cancellation. A fourth motivation is that even when PRACH resources are configured in XDD slots, the PRACH resources are only used when UEs actually transmit respective PRACHs. In several cases, depending on RACH dimensioning, no PRACH transmission would occur in an XDD slot where PRACH transmissions are configured. Therefore, provisioning PRACH resources in XDD slots would often not create DL-UL interference.

Embodiments of the present disclosure take into consideration that when considering resource selection and parameterization in time, frequency and power domains of PRACH resources with FD operation in XDD slots, several issues of existing state-of-the-art technology need to be overcome.

A first issue relates to a need to account for different link conditions for Msg1 and Msg3 transmissions in normal UL slots and in XDD slots. Those different reception conditions at the gNB are due to antenna and panel design and deployment constraints. The number of TRX chains for transmission or reception, or areas for transmission or reception antennas available in normal DL or UL slots versus XDD slots, can be different between FD implementations and half-duplex implementations. This is due to antenna design constraints to achieve sufficient spatial isolation between the Tx and Rx antenna ports in FD operation. For example, receptions at a base station in normal UL slots may benefit from 32 TRX using a 12V×8H×2P panel of size 40×60 cm, whereas receptions at the base station in XDD slots may only use 16 TRX and a part or panel with half size than the one in UL slots.

A second issue relates to the use of both normal, such as full, UL slots and XDD slots by a UE while performing a RA procedure. Normal UL slots and XDD slots may be expected to use different RACH configurations due to different link conditions. A RACH configuration provided for use in XDD slots may support a smaller UL link budget and/or higher Rx preamble target power than a RACH configuration provided for a normal UL slot. For example, RACH configurations may differ in preamble format and number of time-domain RACH occasions per RACH configuration period. A UE starting a PRACH preamble transmissions in an XDD slot may complete the PRACH preamble re-transmissions using a normal UL slot. A UE attempting RA in XDD slots should still be able to perform RA in normal UL slots even when RA in XDD slots fails. Similar, UEs not supporting RA in XDD slots should not be negatively impacted when XDD-optimized UEs start or continue their RA transmissions in normal, such as full, UL slots.

A third issue relates to timelines of the RA procedure for Msg2 and Msg4 when using XDD or FD on an NR carrier. Following a preamble transmission (Msg1), a UE needs to receive a RAR (Msg2) within a RAR window that currently has a maximum setting of 80 slots for a 4-step RA procedure and 320 slots for a 2-step RA procedure. For SCS=30 kHz and 4-step RA procedure, 80 slots correspond to 40 msec or 4 radio frames. Following a Msg3 transmission, a UE starts a contention resolution timer with a maximum possible setting of 64 subframes or 64 msec (for both 4- and 2-step RA). When the contention resolution timer expires, the UE declares contention resolution as failed and performs RA again if the number of RA attempts has not reached the upper limit. Up to 200 RA preamble transmission attempts can be configured. When in RRC_IDLE state or in RRC_INACTIVE state, the UE determines the DL initial BWP using the bandwidth of CORESET #0 indicated by the master information bit (MIB) of the SSB. Only after Msg4 is received, the UE applies the DL initial BWP acquired from SIB1 prior to RA. RAR (Msg2) and Msg4 is transmitted within the Rx bandwidth set by CORESET #0. The UL initial BWP can be set to a different BW when compared to the DL initial BWP, but its center frequency must be aligned with the DL BWP used by the UE for TDD operation. In consequence, constraints arise when using XDD or FD on the NR carrier. Depending on the configured NR channel bandwidth, the sizes and frequency locations of the XDD sub-band and the CORESET #0, DL scheduling of Msg2 and Msg4 is impeded. DCI format 1_0 scheduling PDSCH for RAR (Msg2) or PDSCH for Msg4 cannot be transmitted at all or only using a smaller aggregation level in certain slots.

Various embodiments of the present disclosure addresses the above issues and provides additional design aspects for supporting a RA procedure where some or all associated messages are transmitted either in full or in part in XDD slots, and provides solutions as fully elaborated in the following.

The disclosure considers methods for PRACH preamble transmission and backoff procedures, UL transmit power control during RA, fallback procedures during RA, and timing and length of RAR reception and monitoring window.

Although FIG. 12 illustrate example diagram 1200, various changes may be made to FIG. 12. For example, while the diagram 1200 describes a PRACH configuration, various components combined, further subdivided, or omitted and additional components can be added according to particular needs.

Embodiments of the present disclosure describe methods for PRACH preamble transmission, UL transmit power control, fallback procedures, and timing and length of RAR reception and monitoring window by a UE in FD enabled wireless systems during RA. The following concepts are described: (i) transmit power adjustment value(s) and power ramping procedure for RACH transmissions in XDD or FD slot(s) using DELTA_PREAMBLE, PREAMBLE_POWER_RAMPING_STEP, Pc MAX, preambleReceivedTargetPower, referenceSignalPower, etc., (ii) fallback procedure from/to RA in XDD (or FD) slots from/to normal full UL slots; including detailed procedure to adjust or reset accumulated power ramping variables, preamble counters, and signaled open-loop settings, (iii) fallback procedure from/to 2-step, 4-step RACH from/to XDD or full UL slots during RA, and (iv) separate configuration for RAR window size and monitoring window when using RA in XDD or FD slots; obtained from signaling or scaling.

In the following and throughout the disclosure, some configurations, scheduling or resource assignments by a gNB (such as a BS 102) may assume knowledge in the gNB that a UE (such as the UE 116) supports XDD specific provisions. For example, a UE may signal to the gNB through the UE Capability Enquiry procedure that the UE supports XDD specific provisions. The gNB may also signal XDD specific configurations, scheduling or resource assignments using common DL signalling such as SI. When ASN.1 extensions are used, UEs not supporting the ASN.1 extensions will ignore such configurations whereas UEs supporting XDD specific provisions can use either or both legacy/non-XDD and XDD configurations. A gNB may also derive knowledge of XDD specific provisions supported by a UE because the UE uses a set of designated and known (to the gNB) XDD radio resources.

In certain embodiments, the UE determines different UL power control settings for RA transmissions in XDD slots when compared to normal UL slots. These different power control settings are determined using different open-loop parameters and/or different power-control steps. During RA, the UE applies different power ramping step size, power ramping counters and/or preamble counters for XDD slots compared to normal UL slots.

In certain embodiments (such as those described in FIGS. 13 and 14), the UE configured with RA using XDD slot(s) or symbol(s) determines an XDD power adjustment value when computing PREAMBLE_RECEIVED_TARGET_POWER for transmitting the PRACH preamble. The XDD power adjustment value can be applied by the UE when determining DELTA_PREAMBLE or PREAMBLE_POWER_RAMPING_STEP.

The XDD power adjustment value can be tabulated and provided by system specifications or can be signaled to the UE using common or dedicated RRC messages or MAC CEs. The XDD power adjustment value can be signaled as an index value into a set of tabulated or configured values to derive the setting. Instead of providing an absolute value, the XDD power adjustment value can be determined as a relative adjustment value where a first DELTA_PREAMBLE or PREAMBLE_POWER_RAMPING_STEP derived from existing configuration is obtained and is offset by the XDD power adjustment factor to obtain the value for the PRACH preamble transmission. Multiple XDD power adjustment values may be available. The UE can determine the choice of the appropriate XDD power adjustment value depending on one or more of a SCS, preamble format, time-domain allocation of transmission resources, and network-controlled parameters. The XDD power adjustment value may be employed as part of one or multiple other correction factors.

In one example, the XDD power adjustment value is used by the UE to determine the value of DELTA_PREAMBLE as set of tabulated values such as shown in Table (4) and Table (5). When the PREAMBLE_TRANSMISSION_COUNTER is greater than one; and SSB or CSI_RS selected is not changed from the last RACH preamble transmission, the value of DELTA_PREAMBLE is set according to tabulated values. More than one set of tabulated values may be used.

Table (4) describes XDD power adjustment as DELTA_PREAMBLE values for long preamble formats, while Table (5) describes XDD power adjustment as DELTA_PREAMBLE values for short preamble formats.

TABLE 4

| Preamble Format | DELTA_PREAMBLE values |
|---|---|
| 0 | 3 dB |
| 1 | 0 dB |
| 2 | −3 dB |
| 3 | 3 dB |

TABLE 5

| Preamble Format | DELTA_PREAMBLE values (dB) |
|---|---|
| A1 | $11 + 3 \times \mu$ |
| A2 | $8 + 3 \times \mu$ |
| A3 | $6 + 3 \times \mu$ |
| B1 | $11 + 3 \times \mu$ |
| B2 | $8 + 3 \times \mu$ |
| B3 | $6 + 3 \times \mu$ |
| B4 | $3 + 3 \times \mu$ |
| C0 | $14 + 3 \times \mu$ |
| C2 | $8 + 3 \times \mu$ |

In another example, the XDD power adjustment value is used by the UE to determine the value of DELTA_PRE-AMBLE from existing tables such as shown Table (1) and Table (2). When the PREAMBLE_TRANSMISSION_COUNTER is greater than one, and SSB or CSI_RS selected is not changed from the last RACH preamble transmission, the value of DELTA_PREAMBLE is determined from the tabulated values such as shown in Table (1) and Table (2) and the XDD adjustment value. For example, for preamble format A1 and SCS=30 kHz, the UE determines a DELTA_PREAMBLE value of 11 dB. The UE adjusts the DELTA_PREAMBLE value of 11 dB by an XDD power adjustment value of 3 dB to obtain a value of 14 dB to compute the preamble transmission power. A relative XDD power adjustment value can be one or multiple sets, possibly depending on one or more of SCS, or preamble formats, or transmission resource assignments.

In another example, the XDD power adjustment value is used by the UE to determine the value of the PREAMBLE_POWER_RAMPING_STEP. When RA is initiated on a serving cell, the UE sets the PREAMBLE_POWER_RAMPING_STEP to a signaled or tabulated value for RA transmissions in XDD slot(s) or symbol(s). For example, a signaled parameter powerRampingStepFD where FD stands for full-duplex is obtained by the UE through common or dedicated signaling such as RRC. The UE sets the PREAMBLE_POWER_RAMPING_STEP to powerRampingStepFD. Multiple signaled values may be configured. The UE may determine the choice of the appropriate XDD power adjustment value depending on SCS, preamble format, time-domain allocation of transmission resources and network-controlled parameters. The XDD power adjustment value to determine PREAMBLE_POWER_RAMPING_STEP may be employed as part of one or multiple other correction factors such as for example a msgA-PreamblePowerRampingStep of a 2-step RA procedure.

In another example, the XDD power adjustment value used by the UE to determine the value of the PREAMBLE_POWER_RAMPING_STEP is applied as an offset or relative value. An existing configuration such as a signaled parameter powerRampingStep is obtained and is offset by the XDD power adjustment factor to obtain the value for the PRACH preamble transmission. For example, a setting of dB4 (or 4 dB) may be signaled to the UE for the parameter powerRampingStep. The UE determines a value of 7 dB for PREAMBLE_POWER_RAMPING_STEP using the first signaled 4 dB value and a second XDD power adjustment value of X=3 dB. Multiple XDD power adjustment values may be available. The UE may determine the choice of the appropriate XDD power adjustment value depending on one or more of a SCS, preamble format, time-domain allocation of transmission resources, and network-controlled parameters. The XDD power adjustment value may be employed as part of one or multiple other correction factors.

Figure 13:
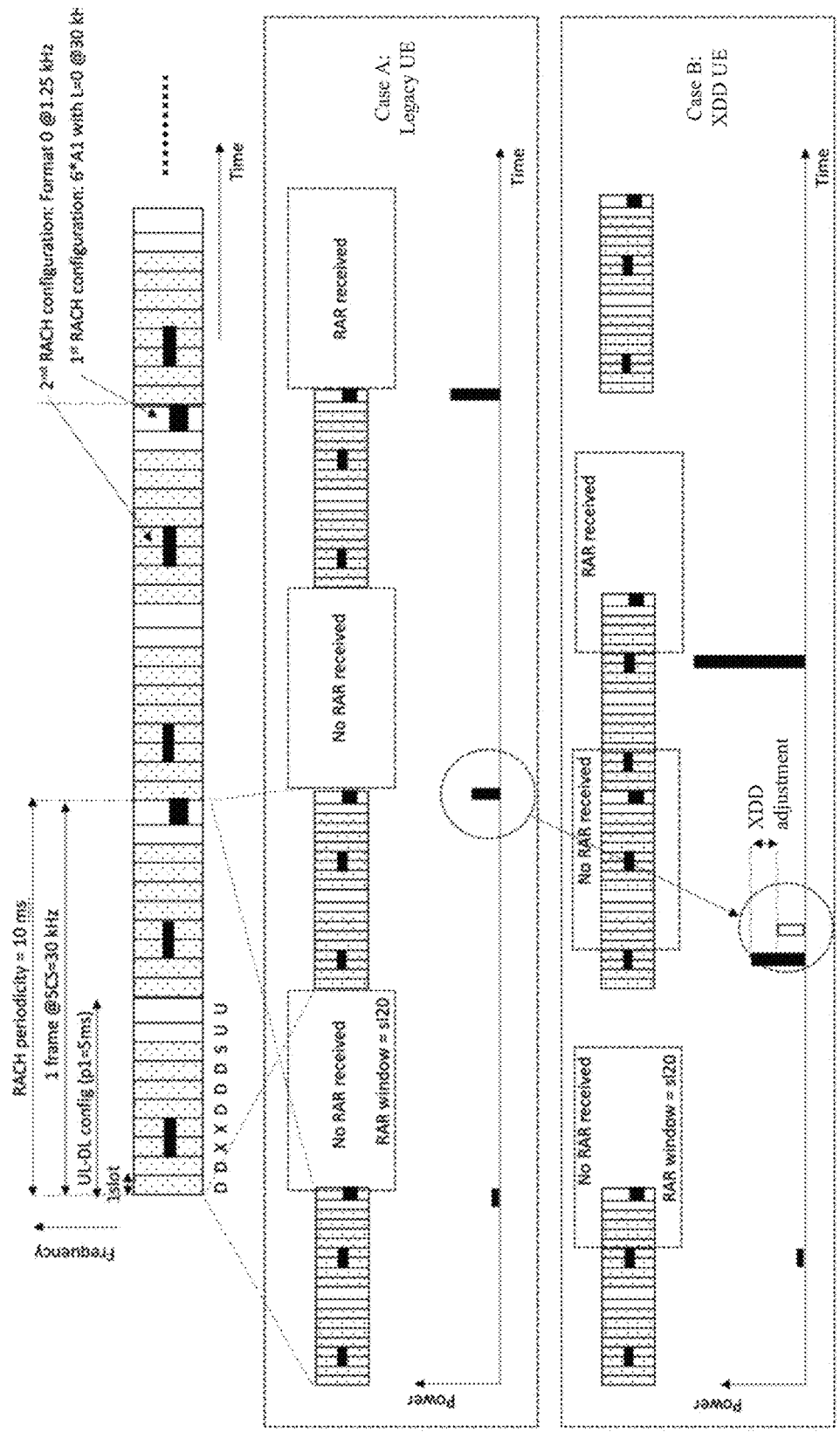
FIG. 13 illustrates an example diagram of a PRACH preamble transmission sequence according to embodiments of the present disclosure.
Figure 14:
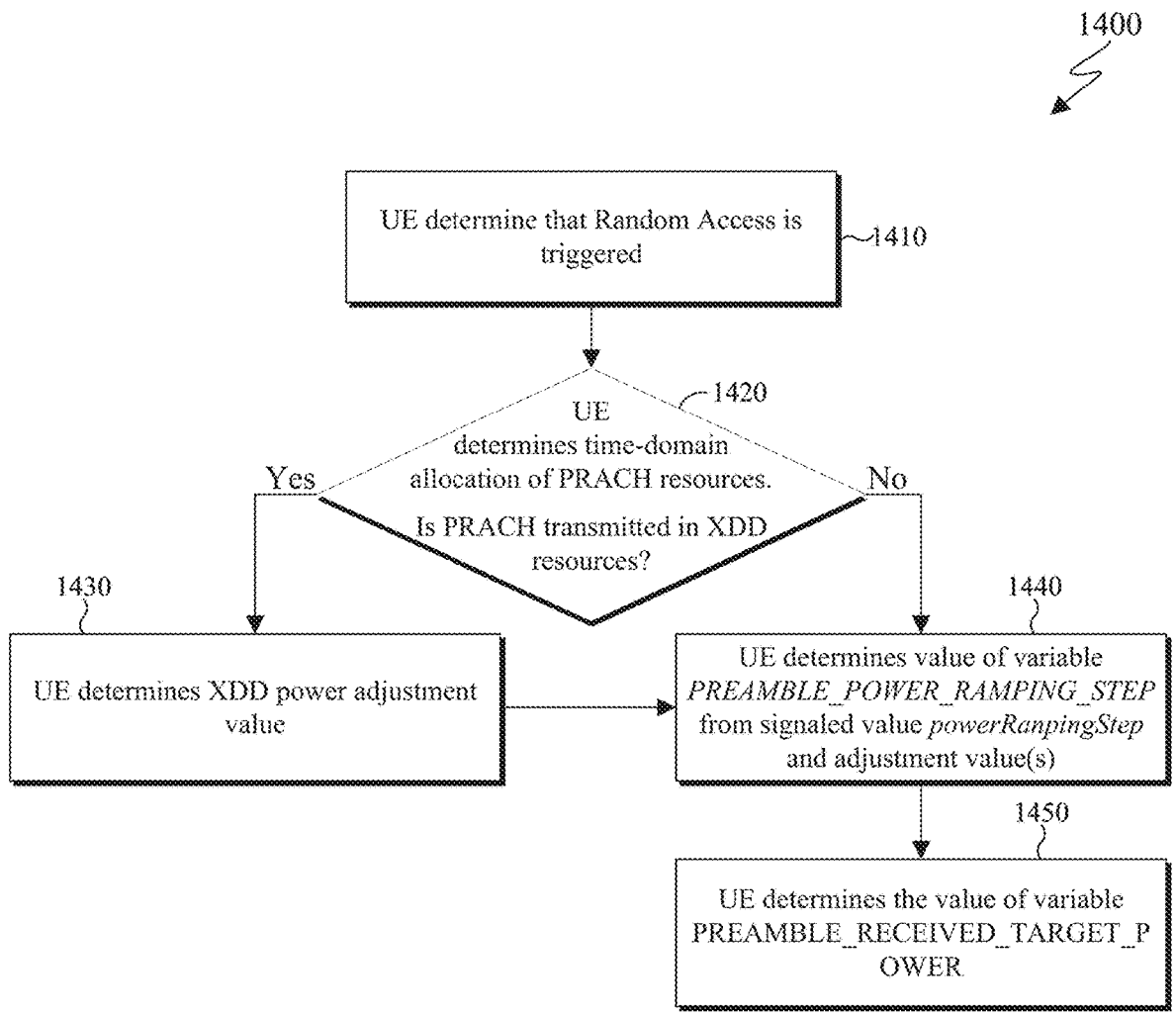
FIG. 14 illustrates an example method of a PRACH transmission processing chain according to the embodiments of the present disclosure.

FIG. 13 illustrates an example diagram 1300 of a PRACH preamble transmission sequence according to embodiments of the disclosure. FIG. 14 illustrates an example method 1400 of a PRACH transmission processing chain according to the embodiments of the present disclosure. The diagram 1300 and the method 1400 are for illustration only and other embodiments can be used without departing from the scope of the present disclosure. The steps of the method 1400 of FIG. 14 can be performed by any of the UEs 111-116 of FIG. 1, such as the UE 116 of FIG. 3. The diagram 1300 and method 1400 are for illustration only and other embodiments can be used without departing from the scope of the present disclosure.

As illustrated in FIG. 13, RACH periodicity is 10 msec. A SCS=30 kHz and an UL-DL configuration DDXXDDD-SUU over 5 ms are used. UEs that do not support XDD access the cell using PRACH configured in the normal UL slot. XDD UEs use PRACH configured in XDD slots #2 and #3. The power-ramping sequence for the UEs that do not support XDD is shown as Case A. The power-ramping sequence for the XDD UEs is shown as Case B. Between a first and a second re-transmission of a PRACH preamble, an XDD UE (Case B) determines a different PRACH preamble transmission power compared to a UE that does not support XDD (Case A) through use of an XDD power adjustment value when computing PREAMBLE_RECEIVED_TARGET_POWER using DELTA_PREAMBLE and/or PREAMBLE_POWER_RAMPING_STEP for a given PRACH transmission.

As illustrated in FIG. 14, an example PRACH transmission processing chain according to embodiments of the disclosure. A UE determines a need for a RA procedure. If the selected RA radio resources include XDD or FD radio resources, the UE determines an XDD adjustment value from a signaled or tabulated value(s) and possibly conditioned on transmission conditions such as an SCS. The UE determines the value of the PRACH preamble power ramping step by accounting for the XDD adjustment value. Multiple adjustment values may be accounted for when setting the value of the power ramping step. The UE determines the value of the PRACH received target power and transmits a PRACH. A similar PRACH transmission processing chain can be used when using DELTA_PREAMBLE to account for the XDD adjustment value.

In step 1410, a UE (such as the UE 116) determines that RA is triggered. In step 1420, the UE determines time-domain allocation of PRACH resources. The UE, in step 1420, also determines whether PRACH is transmitted in XDD resources. In response to a determination that PRACH is transmitted in XDD resources (as determined in step 1420), the UE, in step 1430, determines XDD power adjustment value.

In step 1440, the UE determines the value of variable PREAMBLE_POWER_RAMPING_STEP from signaled value powerRampingStep and adjustment step. In step 1450, the UE determines the value of the variable PREAMBLE_RECEIVED_TARGET_POWER.

Although FIG. 13 illustrates the diagram 1300 and FIG. 14 illustrates the method 1400 various changes may be made to FIGS. 13 and 14. For example, while the method 1400 is shown as a series of steps, various steps could overlap, occur in parallel, occur in a different order, or occur multiple times. In another example, steps may be omitted or replaced by other steps. For example, steps of the method 1400 can be executed in a different order.

In certain embodiments (such as those described in FIGS. 15 and 16), a UE (such as the UE 116) configured with RA using symbols in XDD slot(s) determines a PRACH transmit power using a second PRACH transmit power parameter set. A first PRACH transmit power parameter set may be configured for RA in normal, such as full, UL slots. The second, such as XDD, PRACH transmit power parameter set is used when at least one RA transmission occurs in symbols of an XDD slot. A PRACH transmit power parameter set may comprise one or more of (i) P-Max, (ii) preambleReceivedTargetPower, and (iii) referenceSignalPower. Here, P-Maxis a configured allowed UL transmission power value for a UE; possibly per carrier, per BWP, per serving cell, or for a transmission occasion. PreambleReceivedTargetPower is a target PRACH reception power value. Additionally, referenceSignalPower is a reference signal transmit power signaled by a base station to a UE for determining pathloss in an active BWP; pathloss determination by the UE may be associated with L1 and higher layer filter configurations.

The XDD PRACH transmit power parameter set can be tabulated and provided by system specifications or can be signaled to the UE using common or dedicated RRC messages or MAC CEs. The XDD PRACH transmit power parameter set can be signaled as an index value into a set of tabulated or configured values to derive the setting. The XDD PRACH transmit power parameter set can be determined as a relative adjustment value compared to a first PRACH transmit power parameter set derived from an existing configuration that is obtained and then offset by the XDD adjustment factor to obtain the value for the PRACH preamble transmission power. Multiple XDD values or sets for XDD PRACH transmit power parameters may be available. The UE determines the choice of the appropriate XDD PRACH transmit power values depending on one or more of an SCS, preamble format, time-domain allocation of transmission resources, and network-controlled parameters. The XDD PRACH transmit power values may be employed as part of one or multiple other correction factors.

In one example, P-Max is used by the UE to determine transmission power for PRACH, $P_{PRACH,b,f,c}(i)$, on active UL BWP b of carrier f of serving cell c based on DL RS for serving cell c in an XDD or FD transmission occasion i. The value of P-Max for XDD slot(s) or symbol(s) is signaled for RA transmissions. For example, a signaled parameter P-Max-FD where FD stands for FD is obtained by the UE through common or dedicated signaling such as RRC. The UE sets $P_{PRACH,b,f,c}(i)$ to the smaller of (a) the configured P-Max-FD and (b) the sum of computed PRACH target reception power and the pathloss. Multiple signaled values may be configured. The UE may determine the choice of the appropriate maximum configured or allowed transmission power depending on one or more of the SCS, preamble format, time-domain allocation of transmission resources, and network-controlled parameters.

In another example, preambleReceivedTargetPower is used by the UE to determine transmission power for PRACH, $P_{PRACH,b,f,c}(i)$, on active UL BWP b of carrier f of serving cell c based on DL RS for serving cell c in an XDD or FD transmission occasion i. The value of preambleReceivedTargetPower for XDD slot(s) or symbol(s) is signaled for RA transmissions. For example, a signaled parameter preambleReceivedTargetPowerFD where FD stands for FD is obtained by the UE through common or dedicated signaling such as RRC. The UE sets $P_{PRACH,b,f,c}(i)$ to the smaller of (a) the configured P-Max and (b) the computed sum of preambleReceivedTargetPowerFD and the pathloss. Multiple signaled values may be configured. The UE may determine the choice of the appropriate preambleReceivedTargetPower depending on SCS, preamble format, time-domain allocation of transmission resources and network-controlled parameters.

In another example, referenceSignalPower is used by the UE to determine transmission power for PRACH, $P_{PRACH,b,f,c}(i)$, on active UL BWP b of carrier f of serving cell c based on DL RS for serving cell c in an XDD or FD transmission occasion i. The value of referenceSignalPower for symbols of XDD slots is signaled for RA transmissions. For example, a signaled parameter referenceSignalPower is signaled by ss-PBCH-BlockPower. A different value of ss-PBCH-BlockPower is provided to the UE for RACH transmission in symbols of XDD slots when compared to normal, such as full, UL slots. The UE sets $P_{PRACH,b,f,c}(i)$ to the smaller of (a) the configured P-Max and (b) the computed sum of preambleReceivedTargetPower and the pathloss. For the same RSRP measurement value derived from either SSB or CSI-RS, the UE computes a different value for pathloss in XDD slot(s) or symbol(s) using the different signaled ss-PBCH-BlockPower values. It is also possible to use a same ss-PBCH-BlockPower value for XDD and normal UL slots but apply the correction value by means of a relative offset value. For example, powerControlOffsetFD where FD stands for FD is obtained by the UE through common or dedicated signaling such as RRC. Multiple signaled values may be configured. The UE may determine the choice of the appropriate referenceSignalPower depending on one or more of an SCS, preamble format, time-domain allocation of transmission resources, and network-controlled parameters.

Figure 15:
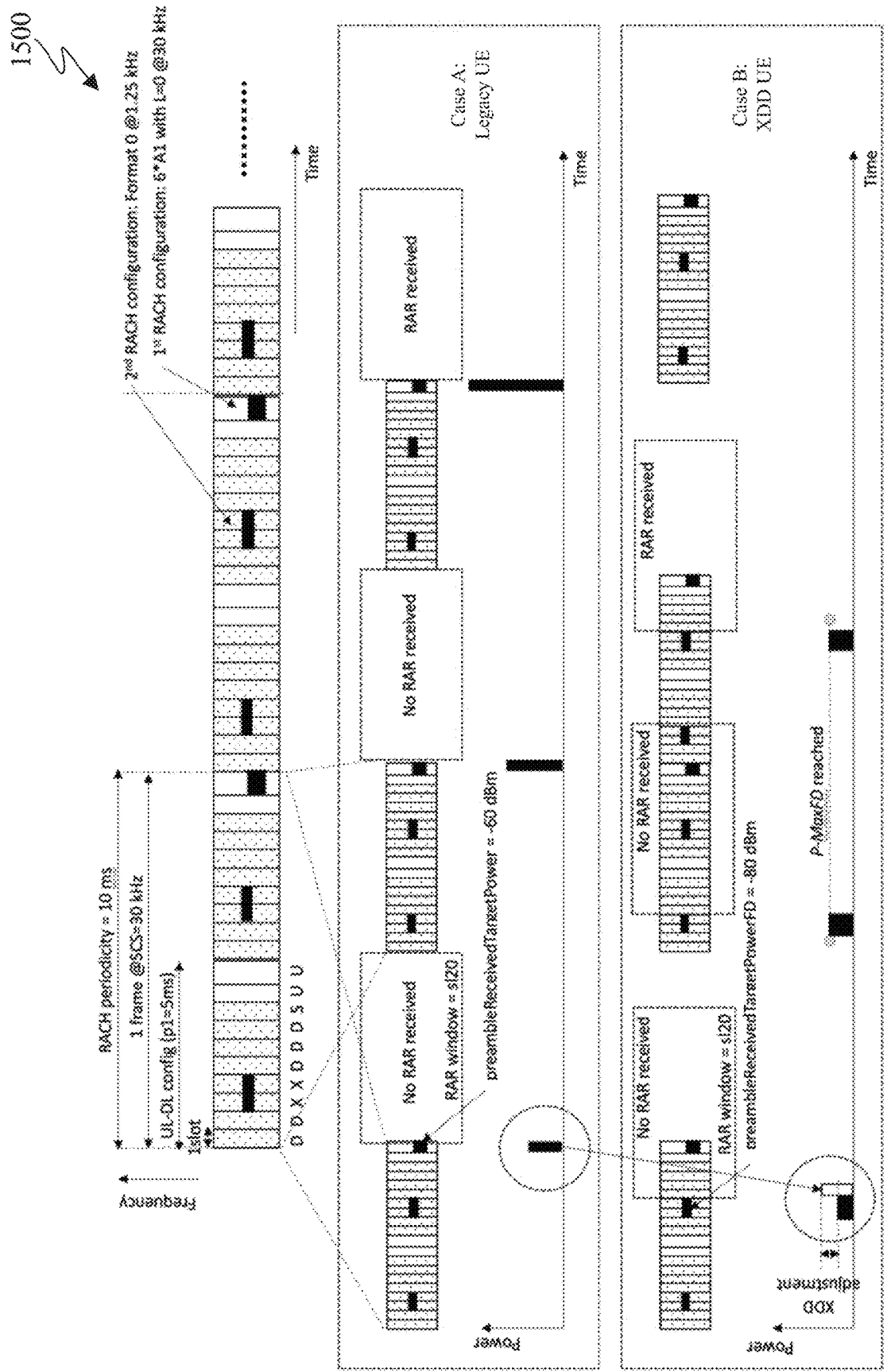
FIG. 15 illustrates an example diagram of a PRACH preamble transmission sequence according to embodiments of the present disclosure.
Figure 16:
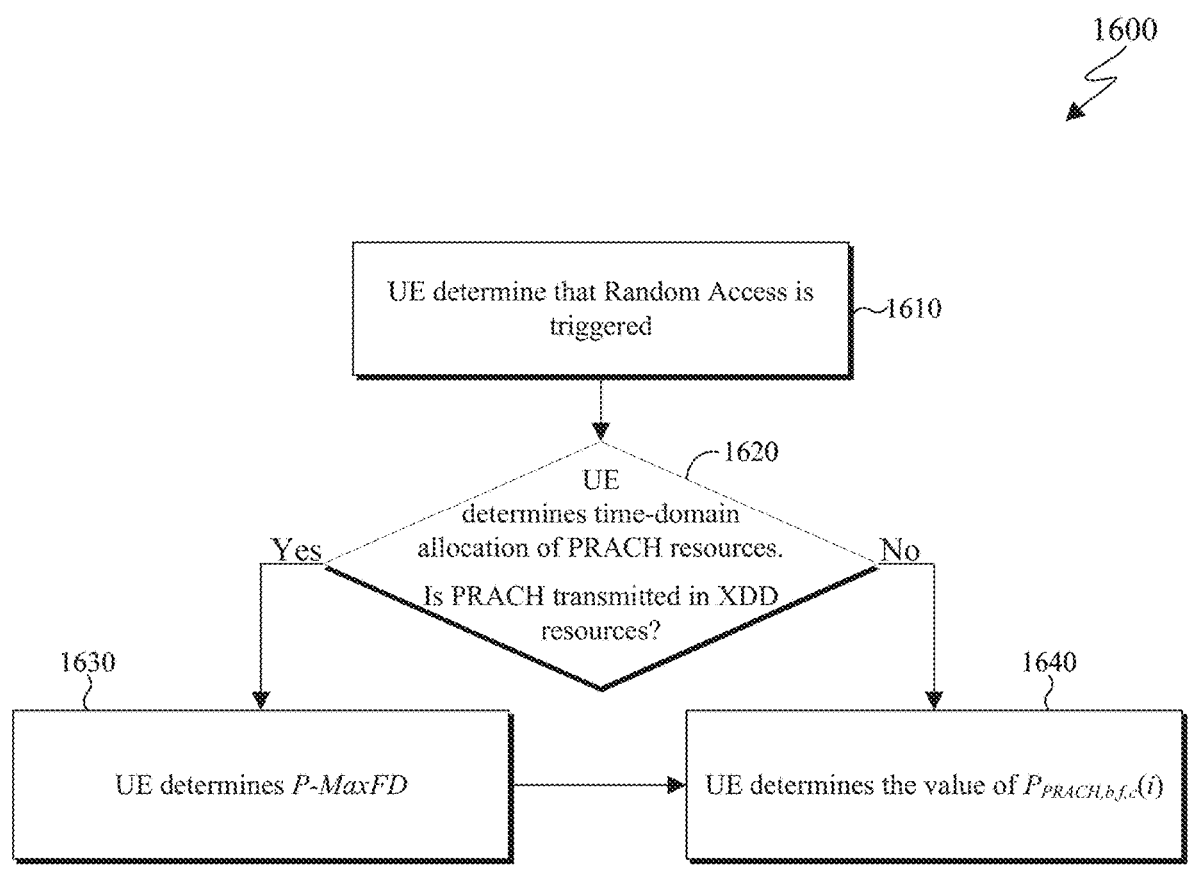
FIG. 16 illustrates an example method of a PRACH transmission processing chain according to the embodiments of the present disclosure.

FIG. 15 illustrates an example diagram 1500 of a PRACH preamble transmission sequence according to embodiments of the present disclosure. FIG. 16 illustrates an example method 1600 of a PRACH transmission processing chain according to the embodiments of the present disclosure. The diagram 1500 and the method 1600 are for illustration only and other embodiments can be used without departing from the scope of the present disclosure. The steps of the method 1600 of FIG. 16 can be performed by any of the UEs 111-116 of FIG. 1, such as the UE 116 of FIG. 3. The diagram 1500 and the method 1600 are for illustration only and other embodiments can be used without departing from the scope of the present disclosure.

As illustrated in FIG. 15, an example PRACH preamble transmission sequence according to embodiments of the disclosure. RACH periodicity is 10 msec. UL-DL configuration DDXXDDDSUU and SCS=30 kHz are used. UEs that do not support XDD access the cell using PRACH configured in the normal UL slot. XDD UEs use PRACH configured in XDD slots #2 and #3. The power-ramping sequence for UEs that do not support XDD is shown as Case A. The power-ramping sequence of the XDD UEs is shown as Case B. For the first transmission of a PRACH preamble, a XDD UE (Case B) determines a lower PRACH preamble transmission power compared to a UE that does not support XDD (Case A) through use of a lower configured preambleReceivedTargetPower value in the XDD slot. Already in the second re-transmission, the XDD UE (Case B) has reached the maximum allowed configured P-MaxFD transmission power and does not further increase PRACH preamble power in the third re-transmission attempt, whereas the UE that does not support XDD (Case A) and is configured with a different setting can further increase a preamble transmission power.

The method 1600 describes an example PRACH transmission processing chain according to embodiments of the disclosure. A UE determines a need to initiate a RA procedure. If the selected RA radio resources include XDD or FD radio resources, the UE determines an XDD maximum configured transmit power value from signaled or tabulated value(s) and possibly conditioned on transmission conditions, such as XDD transmission bandwidth, or a resource allocation in frequency-domain. The UE determines the value of the PRACH transmission power by accounting for the maximum allowed XDD transmit power value. Multiple adjustment values may be accounted for when setting the value of the power ramping step. The UE determines the value of the PRACH transmission power and transmits PRACH.

In particular, in step 1610, a UE determines that RA is triggered. In step 1620, the UE determines time-domain allocation of PRACH resources. The UE, in step 1620, also determines whether PRACH is transmitted in XDD resources. In response to a determination that PRACH is transmitted in XDD resources (as determined in step 1620) the UE determines P-MaxFD (step 1630). Alternatively, after the UE determines P-MaxFD (step 1630) or in response to a determination that PRACH is transmitted in XDD resources (as determined in step 1620) the UE in step 1640 determines the value of $P_{PRACH,b,f,c}(i)$.

A motivation is to adjust a received power level at a base station during a RA procedure by a UE in XDD slots. When a PRACH transmission is received in normal/full UL slots, PRACH detection can be processed by the base station in absence of any DL interference, thereby maximizing UL coverage and using the full processing gains at the base station. A PRACH transmission received and processed by the base station in symbols of XDD slots may be subject to Rx power constraints considering interference cancellation capabilities of the base station. In addition, control of UL-DL cross-link interference generated by a UE transmitting a PRACH preamble and affecting UEs receiving in the DL part of the XDD slot can be facilitated by using a separate power setting in the FD system.

Although FIG. 15 illustrates the diagram 1500 and FIG. 16 illustrates the method 1600 various changes may be made to FIGS. 15 and 16. For example, while the method 1600 is shown as a series of steps, various steps could overlap, occur in parallel, occur in a different order, or occur multiple times. In another example, steps may be omitted or replaced by other steps. For example, steps of the method 1600 can be executed in a different order.

In certain embodiments (such as those described in FIGS. 17 and 18), the UE configured with RA using symbols of XDD slot(s) falls back to RA using normal, such as full, UL slots when a maximum number of re-transmission attempts using XDD resources has been reached. Alternatively, the UE falls back and attempts RA using normal, such as full, UL slots when a timer value is reached or when a designated signal condition is met. A signal condition may include a RA transmit power value determined by the UE or a signaling message receiving through PDCCH or associated with PDCCH such as the PDSCH carrying RAR (Msg2) and MAC (sub-)headers. The fallback procedure can apply to the 2-step or 4-step RACH procedure and is explained in the following using 4-step RACH procedure by example.

The XDD counter or timer or signal power condition value can be tabulated and provided by system specifications or can be signaled to the UE using common or dedicated RRC messages or MAC CEs. XDD counter or timer or signal power condition value can be signaled as an index value into a set of tabulated or configured values to derive the setting. The XDD counter or timer or signal power condition value can be determined as a relative adjustment value where a first parameter derived from existing configuration is obtained and then offset or scaled by an XDD adjustment factor to obtain the value for the XDD counter or timer or signal power condition value. Multiple XDD counter or timer or signal power condition values may be available. The UE determines the choice of the appropriate XDD counter or timer or signal power condition value depending on one or more of an SCS, preamble format, time-domain allocation of transmission resources, and network-controlled parameters. The XDD counter or timer or signal power condition value may be employed as part of one or multiple other correction factors.

In one example, the UE is configured with a preambleTransMaxFD value where FD denotes FD transmission. When attempting RA (transmitting PRACH) using XDD or FD radio resources, the UE increases a counter for each PRACH preamble transmission attempt on the XDD or FD RACH opportunities. If the counter reaches a value of preambleTransMaxFD, the UE re-selects RA resources only from the set of configured RACH opportunities in normal, such as full, UL slots. The UE then re-attempts RA using the set of the RACH opportunities occurring in normal UL slots. When the UE re-selects to RACH opportunities in normal UL slots, the preamble format may change. Similar, current or accumulated counter or transmission power values may be adjusted by the UE as described in other embodiments of the disclosure. A value for preambleTransMaxFD, such as the number of maximum allowed PRACH preamble transmission attempts, may be signaled by RRC as a value separate from the number of maximum allowed PRACH transmission attempts preambleTransMax that is valid for normal UL slots. It is also possible that the UE derives the value of preambleTransMaxFD by means of scaling the value of preambleTransMax valid for normal UL slots. For example, the UE may be configured to use up to floor (M*preambleTransMax) PRACH preamble transmission attempts using XDD slots where M is a scaling factor, for example M=½.

In another example, the UE is configured with a rach-TimerFD timer value where FD denotes FD transmission. When attempting RA using XDD or FD radio resources, the UE increases the timer while RACH UL transmissions and/or DL receptions are in progress. The timer may count time units such as samples, slots, subframes, frames or multiples thereof. Without loss of generality, the UE may start the timer upon occurrence of an identified transmission condition such as the start of the first or initial PRACH preamble transmission. The UE may stop the timer upon occurrence of an identified condition such as a reception of Msg2 or a successful termination of the RA procedure, such as after a successful Msg4 reception. If the timer reaches a value of rachTimerFD, the UE re-selects RA resources only from the set of configured RACH opportunities in normal, such as full, UL slots. The UE then re-attempts RA (PRACH transmission) using the set of the RACH opportunities occurring in these normal UL slots. When the UE re-selects RACH opportunities in normal UL slots, the preamble format may change. Similar, current or accumulated counter or transmission power values may be adjusted by the UE as described in other embodiments of the disclosure. A value for rachTimerFD, such as the time allowed for attempting RA using XDD slot(s) or radio resources may be signaled by RRC.

In another example, the UE is configured with a rach-MaxPowerFD value where FD denotes FD transmission. When attempting RA (PRACH transmission) using XDD or FD radio resources, the UE increases PRACH transmission power during each PRACH preamble transmission attempt using PREAMBLE_POWER_RAMPING_COUNTER, DELTA_PREAMBLE, and PREAMBLE_POWER_RAMPING_STEP on the XDD or FD RACH opportunities. If a transmission power reaches a value of rachMaxPowerFD, the UE re-selects RA resources only from the set of configured RACH opportunities in normal, such as full, UL slots. The UE then re-attempts RA using the set of the RACH opportunities occurring in normal UL slots. When the UE re-selects RACH opportunities in normal UL slots, the preamble format may change. Similar, the UE may adjust current or accumulated counter or transmission power values as described in other embodiments of the disclosure. A value for rachMaxPowerFD, such as the maximum allowed PRACH preamble transmission power level, may be signaled by RRC. It is also possible that the value of preambleTransMaxFD may be signaled and then derived by the UE by means of scaling or applying an offset value to a known reference values such as $P_{c,max}$. For example, the UE may be configured an offset or power reduction value of M=6 dB. The UE determines the maximum allowed PRACH preamble transmission power for XDD slots as $P_{c,max}$–M in dB.

In another example, the UE attempts RA (PRACH transmission) using XDD or FD radio resources. After a PRACH preamble transmission attempt, the UE monitors PDCCH to determine presence of RAR confirming successful reception by the gNB of the PRACH preamble transmission. For example, a PDCCH is received containing a DCI format 1_0 with CRC scrambled by an RA_RNTI associated with the time and frequency resources of the PRACH occasion that the UE transmitted a PRACH preamble. The PDSCH scheduled by the DCI format 1_0 provides a signaling indication for the UE to continue the RA procedure using normal, such as full, UL slots. For example, a fallbackRAR can be used to re-direct the UE to RA in normal UL slot(s) or symbol(s). For example, the signaling indication can be encoded as one or more bits or codepoints in a MAC header or MAC sub-header or RAR payload. Alternatively, the signaling indication can be encoded as part of the payload of DCI format 1_0. In one exemplary technical realization, the signaling indication consists of a single bit that, when set, indicates to the UE that any further PRACH preamble transmission attempt is by using normal, such as full, UL resources. It is also possible that the signaling bit, when set, indicates that use of XDD or FD resources during later RA attempts is allowed. The signaling indication may be associated with other information controlling further PRACH preamble transmission attempts by the UE. For example, the signaling indication may contain a maximum number of PRACH re-transmission attempts, or a required or allowed power level or transmission parameters associated with XDD or FD radio resources. The signaling indication may also be encoded using codepoints from existing IEs or fields of a DCI format, MAC header or sub-header or PDSCH payload. Upon reception of the fallback signaling indication, the UE continues transmissions for the RA procedure using the indicated mode of operation. For example, if the signaling indication prohibits further use of XDD or FD resources during RA, the UE falls back to RA using normal UL slots.

Figure 17:
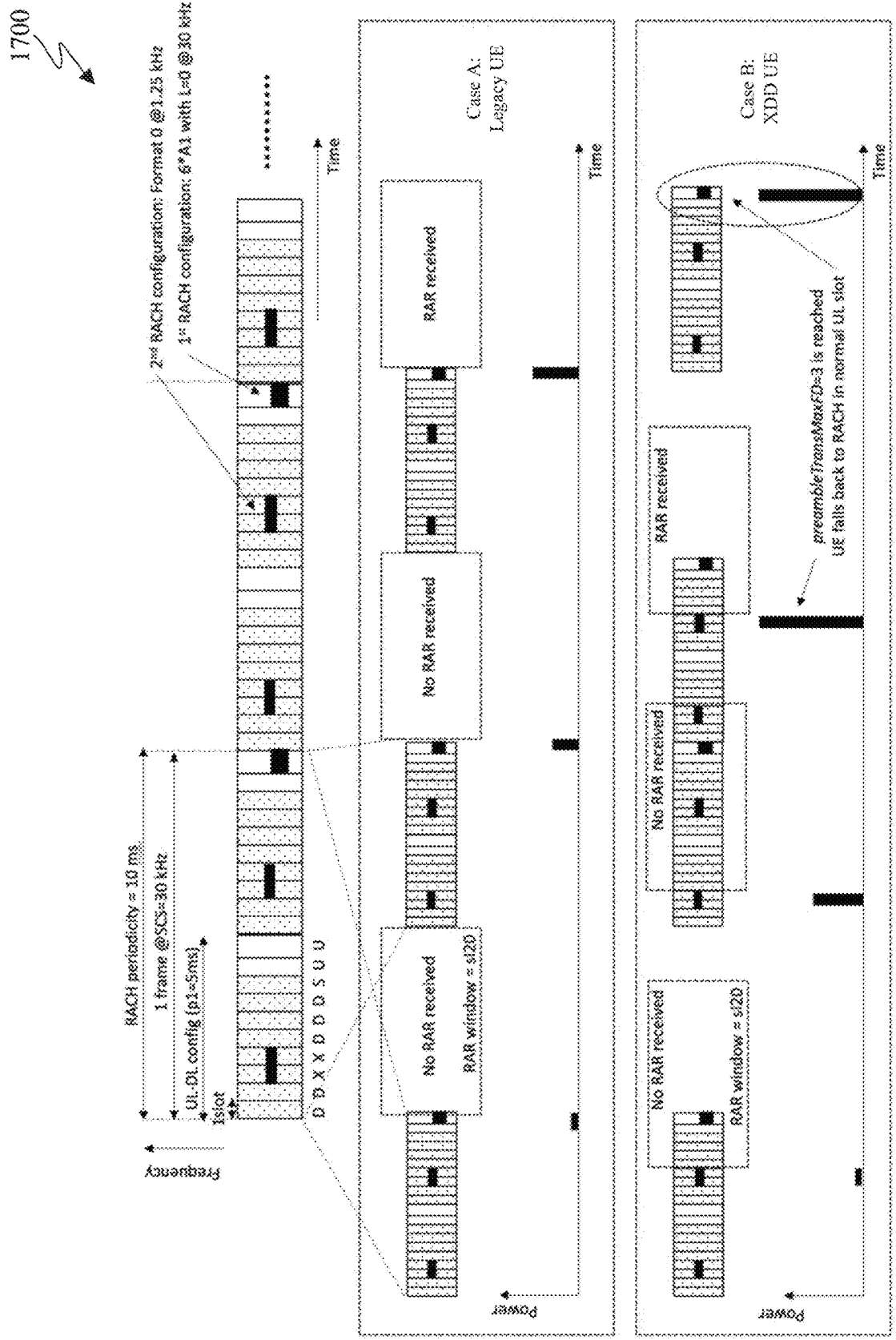
FIG. 17 illustrates an example diagram of a PRACH preamble transmission fallback sequence according to embodiments of the present disclosure.
Figure 18:
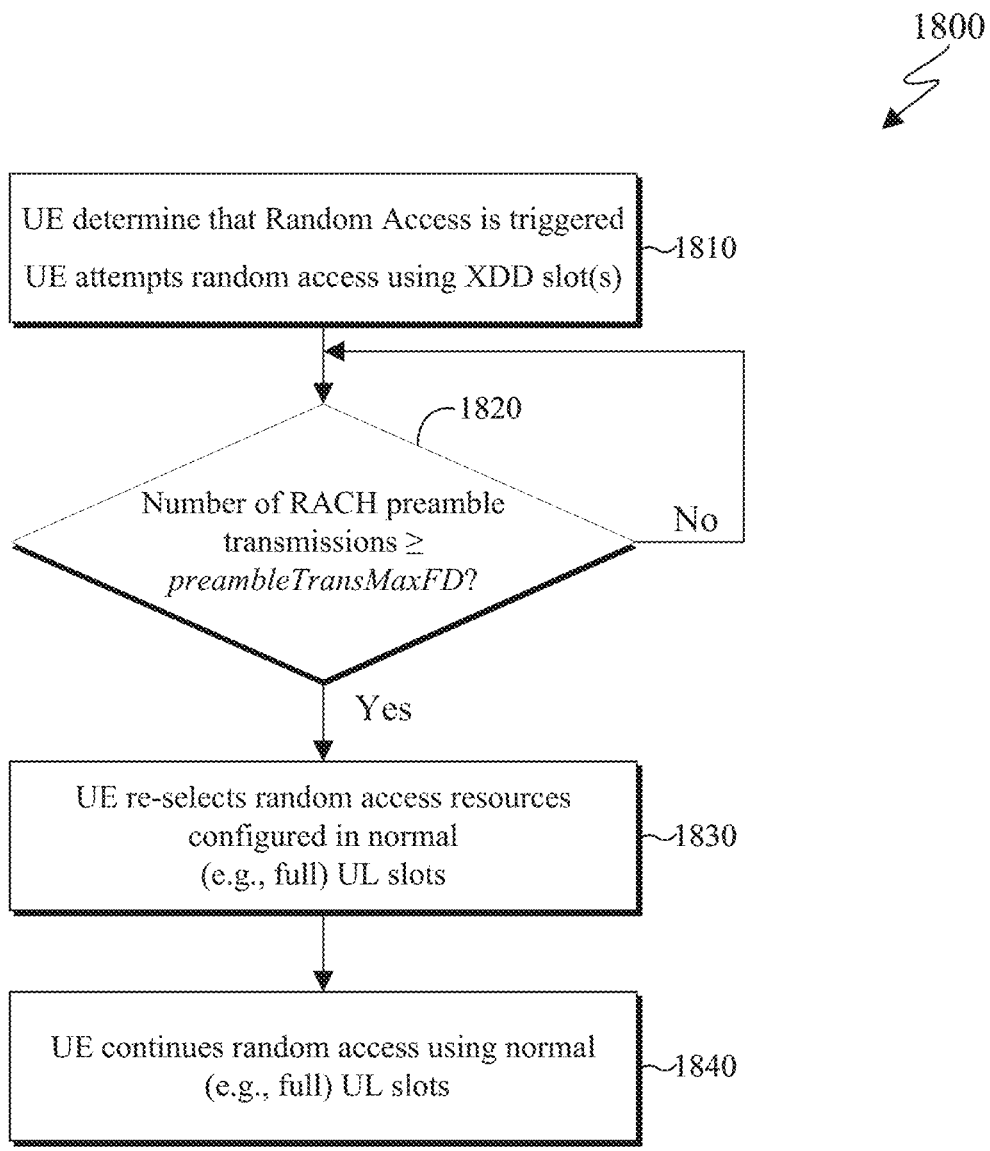
FIG. 18 illustrates an example method of a PRACH transmission fallback processing chain according to the embodiments of the present disclosure.

FIG. 17 illustrates an example diagram 1700 of a PRACH preamble transmission fallback sequence according to embodiments of the present disclosure. FIG. 18 illustrates an example method 1800 of a PRACH transmission fallback processing chain according to the embodiments of the present disclosure. The diagram 1700 and the method 1800 are for illustration only and other embodiments can be used without departing from the scope of the present disclosure. The steps of the method 1800 of FIG. 18 can be performed by any of the UEs 111-116 of FIG. 1, such as the UE 116 of FIG. 3. The diagram 1700 and the method 1800 are for illustration only and other embodiments can be used without departing from the scope of the present disclosure.

FIG. 17 illustrates an example PRACH preamble transmission fallback sequence according to embodiments of the disclosure. PRACH transmission periodicity is 10 msec. The UE is provided a DDXXDDDSUU UL-DL configuration and a 30 kHz SCS for an active UL/DL BWP. UEs that do not support XSS access the cell using PRACH configured in normal UL slots. XDD UEs use PRACH configured in XDD slots #2 and #3. The power-ramping sequence for UEs that do not support XSS is shown as Case A. The power-ramping sequence of the XDD UEs is shown as Case B. An XDD UE is configured with preambleTransMaxFD=3. The XDD UE (Case B) attempts 3 consecutive PRACH preamble transmissions using XDD RA resources and fails to correctly receive a RAR. The XDD UE (Case B) then falls back to using normal UL resources configured as RACH opportunities for its fourth RACH preamble transmission attempt. In this particular example shown in FIG. 17, the UE continues using the PRACH preamble transmission power determined for the third preamble transmission in the XDD slot for RA transmission in the normal UL slot.

FIG. 18 illustrates an example PRACH transmission fallback processing chain according to embodiments of the disclosure. A UE determines a need to perform a RA procedure. The UE selects RA radio resources in XDD, or FD radio resources and determines an allowed maximum number of PRACH preamble transmission attempts using these radio resources. After each PRACH preamble transmission attempt, the UE increases a counter and compares the counter to the allowed maximum number. If the allowed maximum number has been reached, the UE re-selects to RA resources configured in normal, such as full, UL slots and continues the RA procedure.

In particular, in step 1810, a UE (such as the UE 116) determines that RA is triggered and the UE attempts RA using XDD slot(s). In step 1820, the UE determines whether a number of RACH preamble transmissions are greater than or equal to preambleTransMaxFD. In response to a determination that the number of RACH preamble transmissions are greater than or equal to preambleTransMaxFD (as determined in step 1820) the UE, in step 1830 re-selects RA resources configured in normal (full) UL slots. In step 1840, the UE continues RA using normal (full) UL slots.

A motivation is for a UE to first attempt RA using XDD or FD resources in a coverage area of the cell where receive interference levels and UL-DL cross-link interference conditions are favorable for FD operation. Any PRACH transmission attempted by the UE is offloaded from the normal, such as full, UL slot. PRACH detection by the base station, if possible as by signal conditions, can use the full SIC processing gains at the base station. A UE failing RA using the configured XDD or FD resources can still benefit from the UL coverage and cross-link or self-interference free reception conditions in a normal UL slot.

Although FIG. 17 illustrates the diagram 1700 and FIG. 18 illustrates the method 1800 various changes may be made to FIGS. 17 and 18. For example, while the method 1800 is shown as a series of steps, various steps could overlap, occur in parallel, occur in a different order, or occur multiple times. In another example, steps may be omitted or replaced by other steps. For example, steps of the method 1800 can be executed in a different order.

Figure 19:
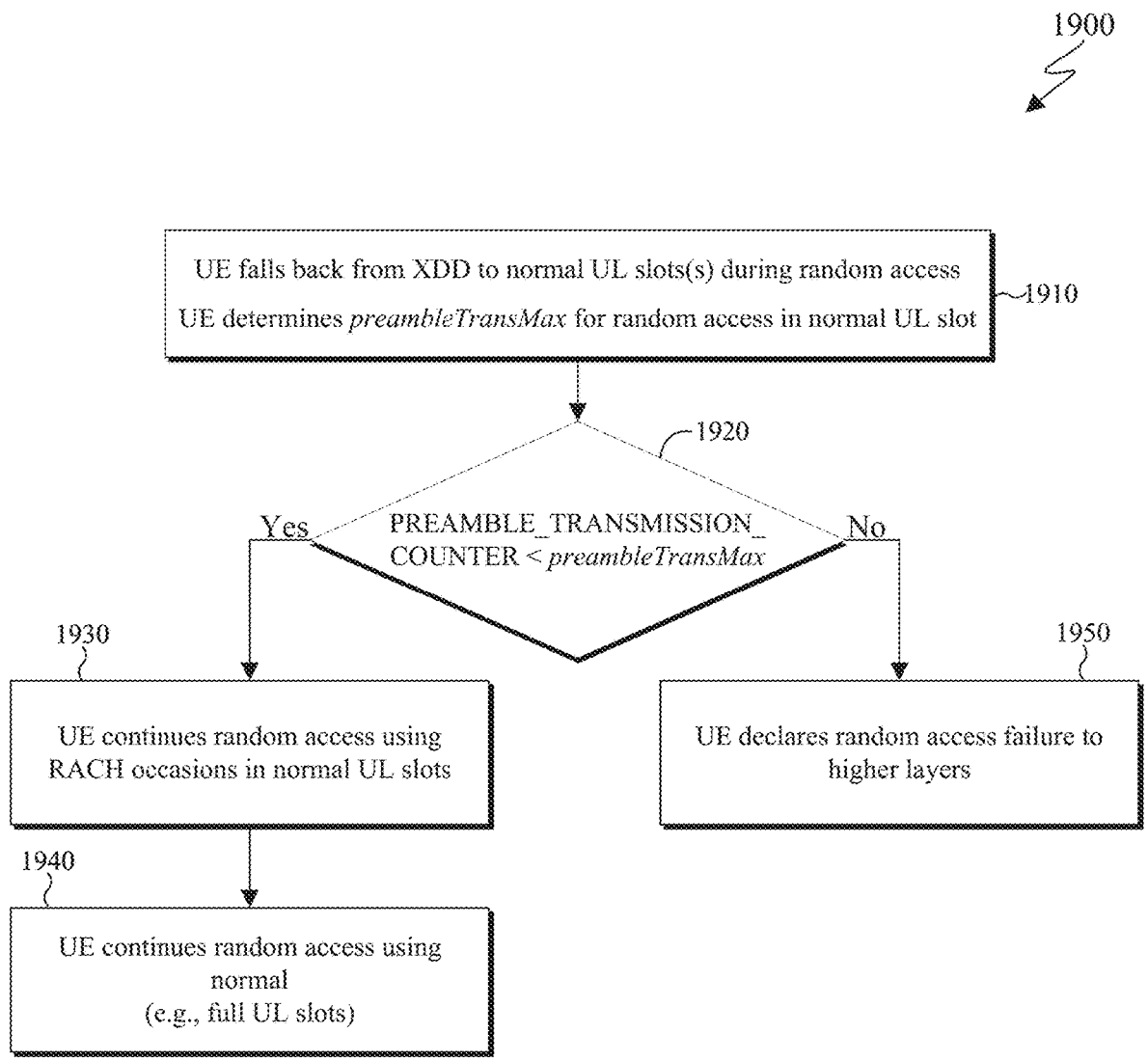
FIG. 19 illustrates an example method of a PRACH parameter fallback processing chain according to the embodiments of the present disclosure.
Figure 20:
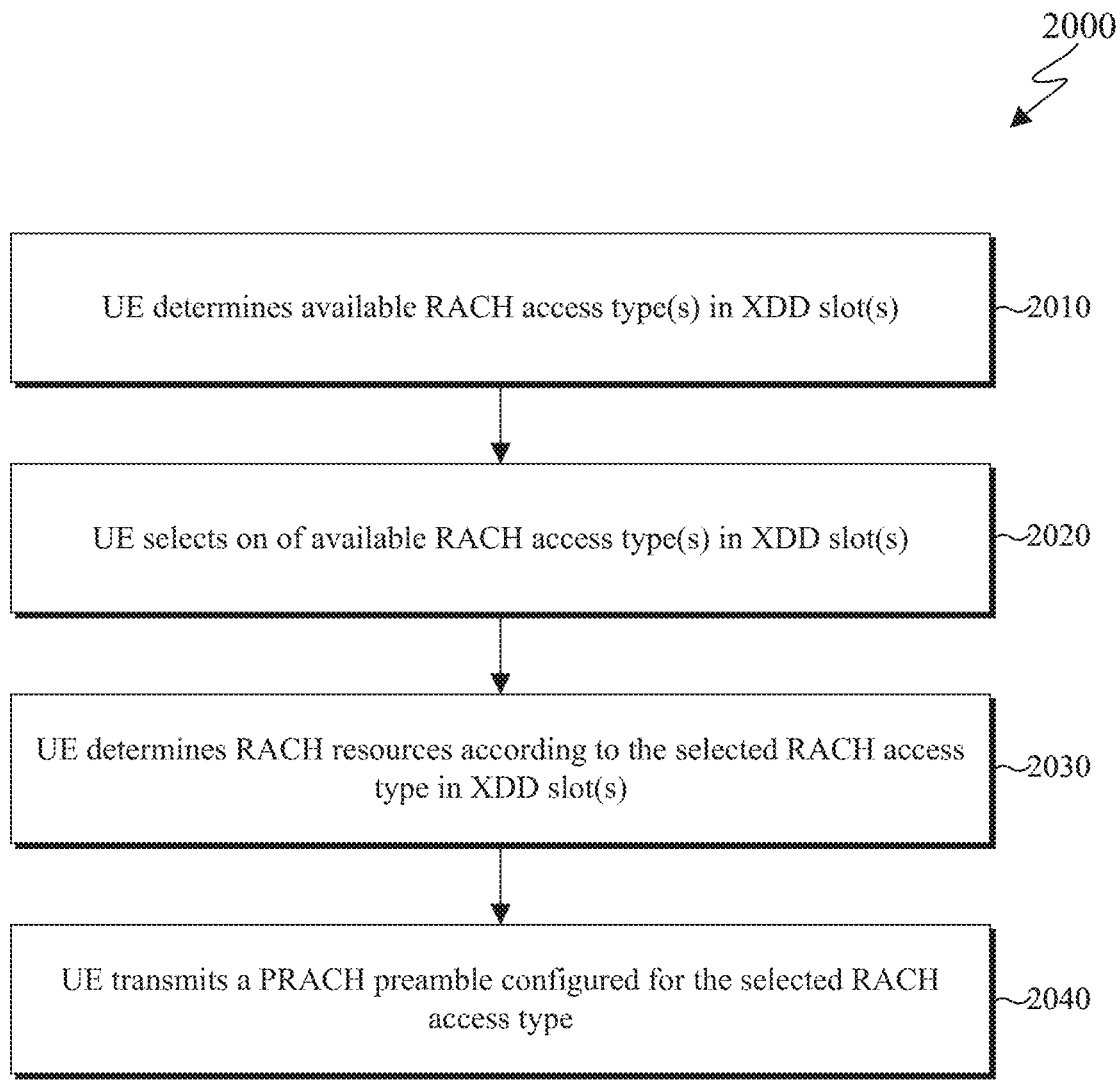
FIG. 20 illustrates an example method of a determination of RA type in XDD or normal UL slot(s) according to embodiments of the present disclosure.
Figure 21:
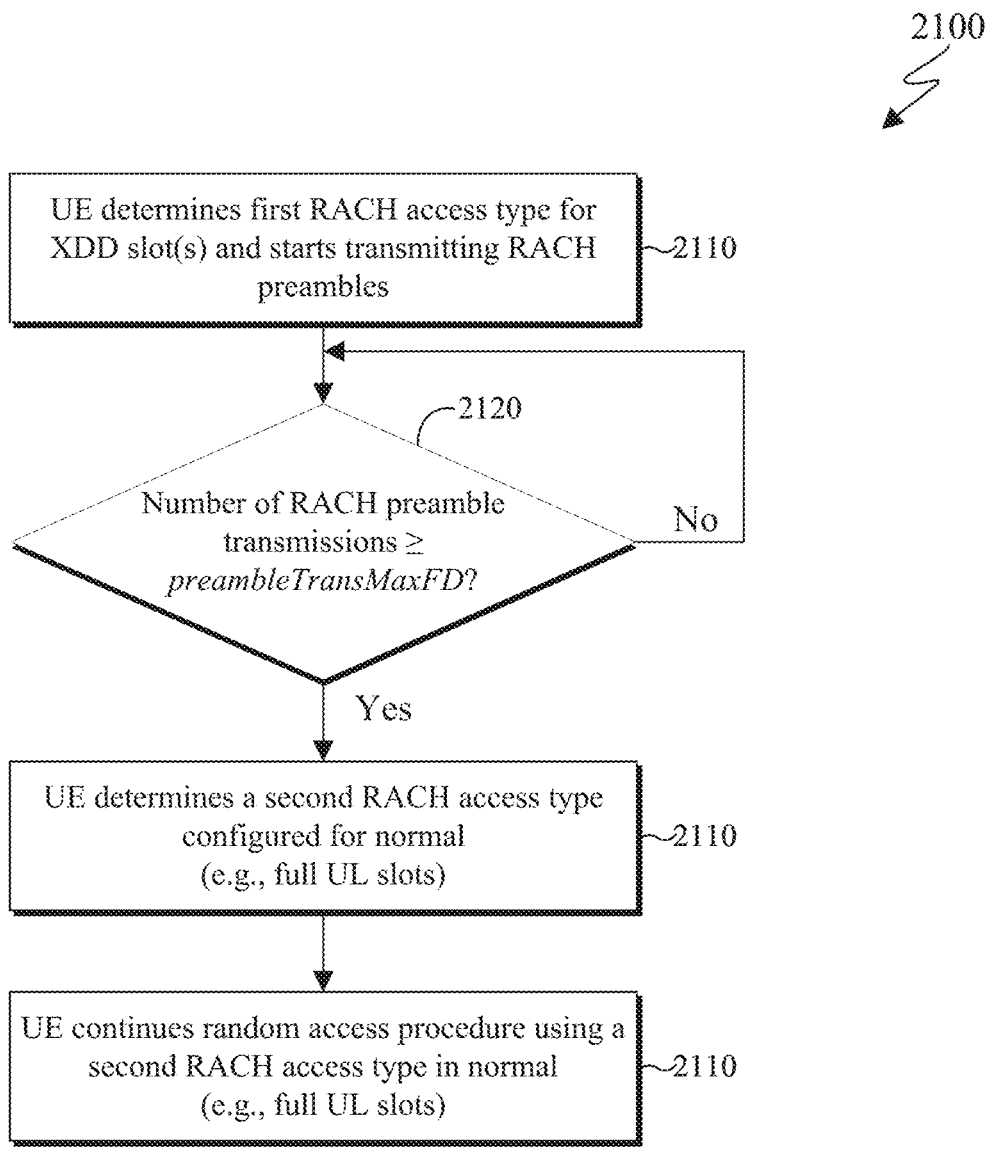
FIG. 21 illustrates an example method of a fallback procedure from 2-step to 4-step RACH in XDD and normal UL slot(s) according to embodiments of the present disclosure.
Figure 22:
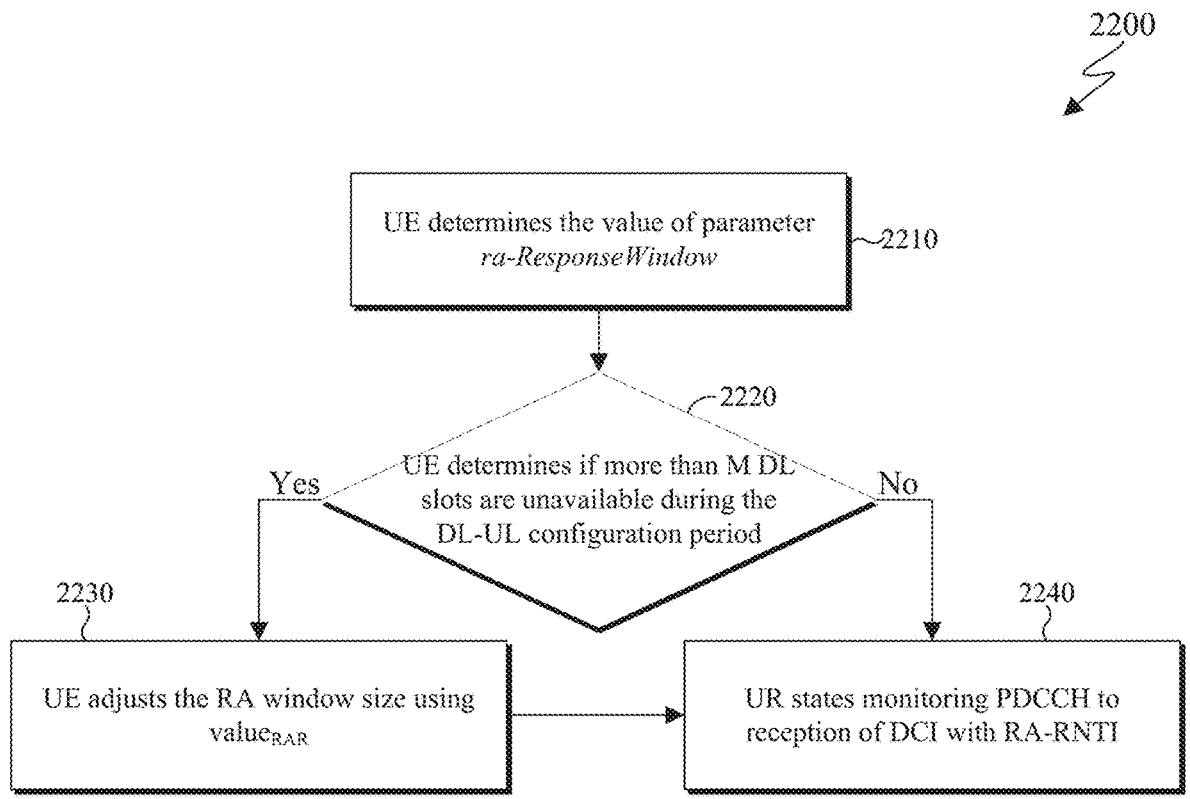
FIG. 22 illustrates an example method of determination of the RAR window size according to embodiments of the present disclosure.

FIG. 19 illustrates an example method 1900 of a PRACH parameter fallback processing chain according to the embodiments of the present disclosure. FIG. 20 illustrates an example method 2000 of a determination of RA type in XDD or normal UL slot(s) according to embodiments of the present disclosure. FIG. 21 illustrates an example method 2100 of a fallback procedure from 2-step to 4-step RACH in XDD and normal UL slot(s) according to embodiments of the present disclosure. FIG. 22 illustrates an example method 2200 of determination of the RAR window size according to embodiments of the present disclosure. The method 1900, the method 2000, the method 2100, and the method 2200 are for illustration only and other embodiments can be used without departing from the scope of the present disclosure. The steps of the method 1900 of FIG. 19, the method 2000 of FIG. 20, the method 2100 of FIG. 21, and the method 2200 of FIG. 22 can be performed by any of the UEs 111-116 of FIG. 1, such as the UE 116 of FIG. 3. The methods 1900-2200 are for illustration only and other embodiments can be used without departing from the scope of the present disclosure.

In certain embodiments (such as those described in FIG. 19, below), the UE switching from/to RA using XDD slot(s) or symbol(s) from/to RA using normal, such as full, UL slots adjusts one or more of the following parameter values before re-attempting or continuing the RA procedure. The parameter values include (i) PREAMBLE_INDEX; (ii) PREAMBLE_TRANSMISSION_COUNTER; (iii) PREAMBLE_POWER_RAMPING_COUNTER; (iv) PREAMBLE_POWER_RAMPING_STEP; (v) PREAMBLE_RECEIVED_TARGET_POWER; (vi) PREAMBLE_BACKOFF; (vii) PCMAX; and (viii) SCALING_FACTOR_BI;

If a single parameter value is configured for RA in XDD slot(s) or normal UL slots, the parameter value may be reset or re-initialized. Alternatively, the parameter value may be preserved and continue to be used during the fallback RA attempt in a normal UL slot. If two or more parameter values are configured, such as a first parameter value for RA in XDD slot(s) and a second parameter value for RA in normal UL slots, the adjustment for any of these parameter values can depend on the parameter under consideration corresponding to one of the following adjustments. The parameter value is reset or re-initialized. The parameter value continues to be used during the fallback procedure. It is possible that the larger of two parameter values is used, or the smaller of two parameter values is used, or the difference between two parameter values is used.

In one example, the UE maintains a PREAMBLE_TRANSMISSION_COUNTER while attempting RA (PRACH preamble transmissions) using XDD slot(s). The counter is increased for each PRACH preamble transmission. When a configured maximum value is reached, the UE falls back to RA in normal UL slots. The PREAMBLE_TRANSMISSION_COUNTER is maintained by the UE during fallback. If an RRC configured preambleTransMax value of n50 (or, 50 times) is set for the RA configuration in normal UL slots, the UE continues to attempt PRACH preamble transmission until this value is reached. For example, after the allowed n10 (or, 10 times) maximum number of PRACH preamble transmissions using XDD slot(s) has been attempted by the UE, the UE continues transmitting RACH in normal UL slots potentially up to (50−10)=40 more times. Alternatively, separate values are used. After the UE fails RA on XDD slot(s) due to reaching the maximum number of preamble transmissions, the UE re-initializes the PREAMBLE_TRANSMISSION_COUNTER. The UE continues RA (PRACH transmissions) in normal UL slots up to the maximum number of PRACH preamble transmissions allowed for normal UL slots, such as potentially up to 50 times using the above example. A similar approach can apply for adjusting the PREAMBLE_POWER_RAMPING_COUNTER upon fallback.

In one example, the UE determines a value for PREAMBLE_POWER_RAMPING_STEP and/or PCMAX while attempting RA (PRACH preamble transmissions) using XDD slot(s). For a PRACH preamble transmission, the UE computes the allowed transmission power using the PREAMBLE_POWER_RAMPING_STEP and/or PCMAX. When the UE reaches a maximum configured allowed transmission power, the UE may not continue to increase the transmission power in a subsequent access attempt. When a configured maximum of PRACH preamble re-transmissions using XDD slot(s) is attained, the UE falls back to RA in normal UL slots. The PREAMBLE_POWER_RAMPING_STEP and/or PCMAX values may change or remain the same during fallback. For example, if a same PCMAX value is configured to be valid for RA in a normal UL slot, the UE maintains the value. The value for PREAMBLE_POWER_RAMPING_STEP may change when the UE changes the preamble format, such as from preamble format 0 in XDD slot(s) to C0 in normal UL slot(s). The UE continues to attempt PRACH preamble transmission after the fallback event using these parameter values.

In case a UE is configured more than one set of RACH configuration parameters for respective use in XDD slots and normal UL slots, the UE retrieves the RACH configuration set valid for the slot type upon fallback. For example, when falling back to RA (PRACH preamble transmissions) in normal slots after a number of unsuccessful RA attempts in XDD slot(s), the UE retrieves from memory RACH configuration parameters for normal UL slots, determines a set of transmission variables as necessary, then attempts RA (PRACH preamble transmissions) using the new RACH parameter values.

The method 1900 as illustrated in FIG. 19 describes an example PRACH parameter fallback processing chain according to embodiments of the disclosure. A UE determines a need to perform fallback using RACH occasions in normal UL slots. The UE selects the maximum number of preamble transmission attempts in normal UL slots. The UE maintains the PREAMBLE_TRANSMISSION_COUNTER. The UE continues PRACH preamble transmissions up the maximum number of preamble transmission attempts in normal UL slots when a number of PRACH preamble transmissions is not larger than the current value of PREAMBLE_TRANSMISSION_COUNTER.

In particular, in step 1910, a UE (such as the UE 116) falls back from XDD to normal UL slot(s) during RA. The UE in step 1910 also determines preambleTransMax for RA in normal UL slot. In step 1920, the UE determines whether PREAMBLE_TRANSMISSION_COUNTER is less than the preambleTransMax. In response to a determination that PREAMBLE_TRANSMISSION_COUNTER is not less than the preambleTransMax (as determined in step 1920) the UE in step 1950 declares RA failure to higher layers. Alternatively, in response to a determination that PREAMBLE_TRANSMISSION_COUNTER is less than the preambleTransMax (as determined in step 1920) the UE in step 1930 continues RA using RACH occasions in normal UL Slots. In step 1940, the UE continues RA using normal (such as full) UL slots.

In certain embodiments (such as those described in FIGS. 20 and 21, below), the UE configured with RA using symbols of XDD slot(s) determines if 2-step RACH and/or 4-step RACH procedure is allowed or enabled in XDD slot(s). The UE may fall back from/to RA in XDD slot(s) during a 2- or 4-step RACH procedure from/to a 2- or 4-step RACH procedure in normal UL slot(s).

The system configuration if 2-step RACH or 4-step RACH procedure is allowed or requested during RA in XDD slot(s) or normal slot(s) can be determined by the UE using configuration parameters which are tabulated, or provided by system specifications, or signaled to the UE. For example, common or dedicated RRC messages or MAC CEs may be used. Multiple settings, possibly depending on protocol state or RA trigger conditions, may exist. For example, 2-step RACH procedure may be enabled or requested XDD slot(s) only in RRC_CONNECTED mode but not in RRC_IDLE mode. The UE may determine the choice of the RACH procedure type depending on one or more of time-domain allocation of transmission resources, frequency-domain radio resource allocation, or network-controlled parameters. Some or all of the messages associated with a 2-step or 4-step RACH procedure may be enabled or requested in XDD slot(s) or normal UL slot(s). For example, only Msg1 (4-step) may be enabled in XDD slot(s) during RA, but Msg3 may be enabled or requested to transmit in normal UL slots during RA.

As described in other embodiments of the disclosure, fallback from/to 2- or 4-step RACH procedure during RA in XDD slot(s) or normal UL slots may be initiated by a counter such as when a maximum number of RACH retransmission attempts using XDD, or normal UL resources has been reached. Alternatively, the UE falls back and attempts RA using a different RA configuration when a timer value is reached or when a designated signal condition is met. A signal condition may include a RA transmit power value determined by the UE or a signaling message receiving through PDCCH or associated with PDCCH such as the PDSCH carrying RAR (Msg2) and MAC (sub-)headers.

In one example, the UE acquires and reads SIB1. The SIB1 carries a RA configuration for the UE as part of the payload. The RA configuration indicates the use of the 4-step RACH ("type 1" procedure) using XDD slot(s) but allows use of either 2-step RACH ("type 2" procedure) or 4-step RACH using normal UL slot(s). The UE determines the RA type, e.g. 2-step RACH when selecting RA using XDD slot(s) from the RA configuration. The UE determines the RA type, e.g. 2-step or 4-step RACH from the set of allowed RA types in normal UL slot(s). For example, the UE might select 2-step RACH in this case due to UE internal configuration preference.

In another example, the UE acquires and reads SIB1 indicating that both 2-step and 4-step RACH are allowed and available in the cell using either XDD or normal UL slot(s). The UE determines the RA type, e.g. 2-step or 4-step RACH from the set of allowed RA types in XDD slot(s) or normal UL slot(s). For example, the UE might select 2-step RACH for RA in normal UL slot(s), but 4-step RACH in XDD slot(s) due to UE internal configuration preference.

In another example, network signaling indicates a requested RA procedure type for use in XDD slot(s) or normal UL slot(s). A PDCCH order carries a RA procedure type indication explicitly or implicitly associated with XDD or normal UL radio resources. The UE sets the RA, e.g. 2-step or 4-step RACH and radio resource type, e.g. XDD slot(s) or normal UL slot(s), according to the received signaling indication, then proceeds with the RA procedure using the determined configuration.

In another example, the UE selects 2-step RACH procedure as RA type in XDD slot(s). The UE transmits a MsgA preamble one ore multiple times. When the UE determines that the RACH preamble transmissions are unsuccessful, for example after reaching a configurable maximum number of MsgA preamble transmissions and no RAR was decoded, the UE falls back to 4-step RACH procedure. The UE sets the RA type from 2-step to 4-step RACH. The UE may reset or re-initialize or preserve settings for some or all of the earlier transmission variables such as described in other embodiments of the disclosure. The UE then re-attempts RA using the XDD slot(s) according to the 4-step RACH procedure.

In another example, the UE selects 2-step RACH procedure as RA type in XDD slot(s). The UE transmits a MsgA preamble one ore multiple times. When the UE determines that the RACH preamble transmissions are unsuccessful, for example after reaching a configurable maximum number of MsgA preamble transmissions and no RAR was decoded, the UE falls back to 4-step RACH procedure in normal UL slot(s). The UE sets the RA type from 2-step to 4-step RACH and changes its RACH configuration to the one configured for normal UL slot(s). The UE may reset or re-initialize or preserve settings for some or all of the earlier transmission variables such as described in other embodiments of the disclosure. The UE then re-attempts RA using the normal UL slot(s) according to the 4-step RACH procedure.

In another example, the UE uses a multi-step fallback procedure during RA. For example, the UE first selects 2-step RACH procedure as RA type in XDD slot(s). The UE then transmits a MsgA preamble one ore multiple times. When the UE determines that the RACH preamble transmissions are unsuccessful, for example after reaching a configurable maximum number of MsgA preamble transmissions and no RAR was decoded, the UE falls back to 4-step RACH procedure in XDD slot(s). The UE sets the RA type from 2-step to 4-step RACH. The UE may reset or re-initialize or preserve settings for some or all of the earlier transmission variables such as described in other embodiments of the disclosure. The UE then re-attempts RA using the XDD slot(s) according to the 4-step RACH procedure. When the UE determines that the RACH preamble transmissions using the 4-step RACH procedure in XDD slot(s) are still unsuccessful, for example after reaching a configurable maximum number of Msg1 preamble transmissions and no RAR was decoded, the UE falls back to 4-step RACH procedure in normal UL slot(s). The UE changes its RACH configuration to the one configured for normal UL slot(s). The UE may reset or re-initialize or preserve settings for some or all of the earlier transmission variables such as described in other embodiments of the disclosure. The UE then re-attempts RA using the normal UL slot(s) according to the 4-step RACH procedure.

In another example, the UE selects 2-step RACH procedure as RA type in XDD slot(s). The UE transmits a MsgA preamble one ore multiple times. The UE receives a signaling indication and determines that the RACH preamble transmissions was successfully received by the gNB. For example, the UE determines the signaling indication by receiving a PDCCH containing a DCI format 1_0 with CRC scrambled by an RA_RNTI associated with the time and frequency resources of the PRACH occasion in which the UE transmitted a PRACH preamble. The PDSCH scheduled by the DCI format 1_0 indicates a fallbackRAR to the UE and re-directs the UE to continue RA in normal UL slot(s) or symbol(s). The UE then continues its RA transmission using the normal UL slot(s).

The method 2000 as illustrated in FIG. 20 describes an example process for determining RA type in XDD or normal UL slot(s) according to embodiments of the disclosure. A UE determines a system configuration indicating if one of 2-step RACH ("type 2") or 4-step RACH ("type 1") is allowed in one of XDD or normal UL radio resources. The UE selects a RA configuration type from the set of available or allowed ones. The UE then proceeds with the RA procedure in the RACH resource selection step conditioned on the selected RA type.

For example, in step 2010, a UE (such as the UE 116) determines available RACH access type(s) in XDD slot(s). In step 2020, the UE selects one of available RACH access type(s) in XDD slot(s). In step 2030, the UE determines RACH resources accordingly to the selected RACH access type in the XDD slot(s). In step 2040, the UE transmits a PRACH preamble configured for the selected RACH access type.

The method 2100 as illustrated in FIG. 21 describes an example fallback procedure from 2-step to 4-step RACH in XDD and normal UL slot(s) according to embodiments of the disclosure. A UE determines if RA transmission using a 2-step RACH ("type 2") procedure in XDD slot(s) is successful. When not successful, the UE changes the RA configuration type to 4-step RACH and/or time-domain resources configured for RA in normal UL slots. The UE then proceeds with the RA procedure in the RACH resource selection step conditioned on the selected RA type.

For example, in step 2110, a UE (such as the UE 116) determines available RACH access type(s) and starts transmitting RACH preambles. In step 2120, the UE determines whether the number of RACH preamble transmissions are equal to or greater than the preambleTransMaxFD. In response to a determination that the number of RACH preamble transmissions are equal to or greater than the preambleTransMaxFD (as determined in step 2120). The UE in step 2130 determines a second RACH access type configured for normal (such as full) UL slots. In step 2140, the UE continues RA procedure using a second RACH access type in normal (such as full) UL slots.

A motivation is for a UE to first attempt random using the fast 2-step RACH procedure ("type 2") access using XDD or FD resources in a coverage area of the cell where receive interference levels and UL-DL cross-link interference conditions are favorable for FD operation. This is beneficial in terms of much reduced control-plane set up delays such as when resuming an RRC connection while in RRC_INACTIVE state for purpose of starting DL and UL and transmission and reception. PRACH detection by the base station, if possible as by signal conditions, can use the full SIC processing gains at the base station. A UE failing RA using the configured XDD or FD resources can still benefit from the UL coverage and cross-link or self-interference free reception conditions in a normal UL slot using the fallback procedure which allows to transition seamlessly to 4-step RACH ("type 1") and/or RA resources configured in normal UL slot(s) when necessary.

In certain embodiments (such as those described in FIG. 22, below), a UE that is configured for RA (PRACH preamble transmissions) using symbols in XDD slots determines a size for a reception window for monitoring PDCCH to detect a DCI format scheduling a PDSCH that provides a RAR, as configured by the higher layer parameter ra-ResponseWindow, using an adjustment value.

The adjustment value may depend on the number or instances of XDD and full UL slots over a time period. A larger window size can be configured for UEs configured with RA using symbols in XDD slots after PRACH preamble transmissions. The window size may be provided by higher layers or can be determined by the UE, for example to capture an impact from reduced DL transmission opportunities for Msg2 due to the use of XDD slots and/or BWP settings.

In one example, the value provided by higher layers for the window size is used, but the indicated/actual length of the window for monitoring PDCCH to detect a DCI format scheduling a PDSCH reception providing a RAR is determined by the UE using an adjustment. A UE transmitting a PRACH preamble in symbols of XDD slots determines an adjusted RAR window size in milliseconds, or determines a set of slots to monitor PDCCH scheduling a Msg2, relative to corresponding values for a UE transmitting a PRACH preamble only in full/normal UL slots. The adjustment can be of fixed size, such as an additional N slots for a number of slots, or an additional N msec for a RAR window size, or can depend on parameters for Msg2 reception, such as on a number of XDD/UL slots or symbols in XDD slots or UL slots, during a time period.

The adjustment value for monitoring PDCCH to decode a DCI format scheduling a RAR, after a PRACH preamble transmission occurs in symbols of XDD slots, can be fixed in the specifications of the system operation or can be provided by higher layers, for example from a list of specified values. Higher layer signaling of adjustment values or indexing of such values can be by RRC or by MAC CE. An adjustment value can be an absolute value or an offset value relative to another signaled value. The adjustment values can be applied to integer or fractional number or multiples of slots or symbols. The size of the window may be derived using a known or configurable SCS setting. For example, the SCS of the Type1-PDCCH CSS set as defined in NR specification may be used.

For example, a RAR window size for monitoring PDCCH to decode a DCI format scheduling a PDSCH reception with a RAR, as configured by higher layer parameter ra-ResponseWindow in number of slots, depends on the slot type. If after a PRACH transmission in an XDD slot #n, M XDD slots are expected to occur for an UL-DL configuration with periodicity/duration of N slots, the RAR window size is increased by M slots.

In another example, a RAR window size for monitoring PDCCH to decode a DCI format scheduling a PDSCH reception providing RAR is indicated by a second signaled parameter ra-ResponseWindowR18, while for a PRACH transmission in UL slots without FD, a size of a subsequent RAR window is indicated by a first signaled parameter ra-ResponseWindow. For example, the first signaled parameter may be set to a value of 10 msec whereas the second signaled parameter is set to 20 msec.

In another example, a RAR window length can depend on transmission parameters of XDD slots or symbols used for PRACH transmission. For example, the RAR window size can be adjusted by a predetermined number of N slots, or a set of such values, after a PRACH preamble transmission to account for time-offset start positions of a PRACH preamble transmission in symbols of an XDD slot. For example, when FD operation is enabled in a cell, a signaled parameter ra-ResponseWindow is increased by a factor of 2, resulting in a window size of 20 msec when a value of 10 msec is signaled.

A motivation for increasing a RAR monitoring window size is to account for a possible loss of DL transmission opportunities in a full duplex system. For example, for a maximum setting of 10 msec for ra-ResponseWindow in a 4-step RA procedure, 17 full DL slots are available in a TDD DDDDDDDSUU configuration with 30 kHz SCS. Fewer DL slots per UL-DL configuration period are available for DDSU or DDDSU. With FD enabled in a cell, depending on a DL and UL initial BWP size and on a location of the initial BWPs during initial access, a number of DL slots may not allow transmission of Msg2. Therefore, an increased RAR window size allows for flexibility in base station processing timeline and Msg2 scheduling, and avoids unnecessary re-transmissions of PRACH preambles by UEs.

The method 2200, as illustrated in FIG. 22, describes an example process for determining the RAR window size according to embodiments of the disclosure. A UE determines a value of a first parameter ra-ResponseWindow. The UE determines a value of a second parameter $value_{RAR}$ associated with a RAR window size. When the UE determines that an adjustment of the RAR window size is necessary or requested, the UE determines a RAR window size from combining the first and second parameter values to obtain a RAR window size that is a sum of ra-ResponseWindow and $value_{RAR}$, or by selecting the larger of the two values, or by selecting to apply one of the two values, such as the $value_{RAR}$ value.

In step 2210, a UE (such as the UE 116) determines the value of parameter ra-ResponseWindow. In step 2220, the UE determines if more than M DL slots are unavailable during the DL-UL configuration period. In response to a determination that more than M DL slots are unavailable during the DL-UL configuration period (as determined in step 2220), the UE in step 2230, adjusts the RAR window size using $value_{RAR}$. In response to a determination that M DL slots or less are unavailable during the DL-UL configuration period (as determined in step 2220) or after adjusting the RAR window size (in step 2230), the UE in step 2240, monitors PDCCH reception of DCI with RA-RNTI.

Although FIG. 19 illustrates the method 1900, FIG. 20 illustrates the method 2000, FIG. 21 illustrates the FIG. 2100, and FIG. 22 illustrates the FIG. 2200 various changes may be made to FIGS. 19-22. For example, while the methods are shown as a series of steps, various steps could overlap, occur in parallel, occur in a different order, or occur multiple times. In another example, steps may be omitted or replaced by other steps. For example, steps of the method 1900 can be executed in a different order.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A method for transmitting a random access channel (RACH) associated with a random access (RA) procedure, the method comprising:
receiving:
first information for first parameters of a first RACH configuration associated with a first subset of slots from a set of slots on a cell,
second information for second parameters of a second RACH configuration associated with a second subset of slots from the set of slots on the cell, and
third information for a condition;
determining whether the condition is valid for transmission in a slot from the second subset of slots; and
transmitting the RACH in the slot from the second subset of slots based on:
the first RACH configuration when the condition is not valid, and
the second RACH configuration when the condition is valid.

2. The method of claim 1, wherein:
a slot from the first subset of slots do not include time-domain resources indicated for reception on the cell, and
a slot from the second subset of slots include time-domain resources indicated for transmission or reception on the cell.

3. The method of claim 1, wherein:
the condition is one of:
a maximum counter value,
a maximum timer value,
a message reception, or
a signal reception quality value that is one of:
a reference signal received power level (RSRP), or
a reference signal received quality (RSRQ) value, and
the condition is valid when:
a number of random-access attempts is equal to or larger than the maximum counter value,
a duration since a first RACH transmission for the RA procedure is equal to or larger than the maximum timer value,
the message indicates that the condition is valid, or
a value associated with a measurement of a received reference signal is equal to or smaller than the signal reception quality value.

4. The method of claim 1, further comprising:
resetting a value of a variable associated with the RA procedure based on the second RACH configuration when the condition is valid, and
using the value of the variable as a value of a first parameter of the first RACH configuration.

5. The method of claim 1, further comprising:
scaling a variable associated with the RA procedure based on the second RACH configuration by an adjustment value when the condition is valid, and
using the scaled variable as a value of a first parameter of the first RACH configuration,
wherein the variable is associated with a value of a second parameter of the second RACH configuration that corresponds to the first parameter of the first RACH configuration.

6. The method of claim 1, further comprising:
determining:
the condition is valid, and
variables for the first RACH configuration in the slot based on resetting, scaling, or reusing corresponding variables for the second RACH configuration in the slot, wherein the variables include at least one of:
a PREAMBLE_INDEX,
a PREAMBLE_TRANSMISSION_COUNTER, and
a PREAMBLE_POWER_RAMPING_COUNTER.

7. The method of claim 1, further comprising:
receiving fourth information for a priority order associated with a two-step or a four-step RA procedure using the first or the second RACH configuration, and determining:
the condition is valid, and
one of the two-step or the four-step RA procedure for the first RACH configuration based on the priority order.

8. A user equipment (UE) for transmitting a random access channel (RACH) associated with a random access (RA) procedure, the UE comprising:
a transceiver configured to receive:
first information for first parameters of a first RACH configuration associated with a first subset of slots from a set of slots on a cell,
second information for second parameters of a second RACH configuration associated with a second subset of slots from the set of slots on the cell, and
third information for a condition; and
a processor operably coupled to the transceiver, the processor configured to determine whether the condition is valid for transmission in a slot from the second subset of slots,
wherein the transceiver is further configured to transmit the RACH in the slot from the second subset of slots based on:
the first RACH configuration when the condition is not valid, and
the second RACH configuration when the condition is valid.

9. The UE of claim 8, wherein:
a slot from the first subset of slots do not include time-domain resources indicated for reception on the cell, and
a slot from the second subset of slots include time-domain resources indicated for transmission or reception on the cell.

10. The UE of claim 8, wherein:
the condition is one of:
a maximum counter value,
a maximum timer value,
a message reception, or
a signal reception quality value that is one of:
a reference signal received power level (RSRP), or
a reference signal received quality (RSRQ) value, and
the condition is valid when:
a number of random-access attempts is equal to or larger than the maximum counter value,
a duration since a first RACH transmission for the RA procedure is equal to or larger than the maximum timer value,
the message indicates that the condition is valid, or
a value associated with a measurement of a received reference signal is equal to or smaller than the signal reception quality value.

11. The UE of claim 8, wherein the processor is further configured to:
reset a value of a variable associated with the RA procedure based on the second RACH configuration when the condition is valid, and
use the value of the variable as a value of a first parameter of the first RACH configuration.

12. The UE of claim 8, wherein the processor is further configured to:
scale a variable associated with the RA procedure based on the second RACH configuration by an adjustment value when the condition is valid, and
use the scaled variable as a value of a first parameter of the first RACH configuration,
wherein the variable is associated with a value of a second parameter of the second RACH configuration that corresponds to the first parameter of the first RACH configuration.

13. The UE of claim 8, wherein the processor is further configured to:
determine:
the condition is valid, and
variables for the first RACH configuration in the slot based on resetting, scaling, or reusing corresponding variables for the second RACH configuration in the slot, wherein the variables include at least one of:
a PREAMBLE_INDEX,
a PREAMBLE_TRANSMISSION_COUNTER, and
a PREAMBLE_POWER_RAMPING_COUNTER.

14. The UE of claim 8, wherein:
the transceiver is further configured to receive fourth information for a priority order associated with a two-step or a four-step RA procedure using the first or the second RACH configuration, and
the processor is further configured to determine:
the condition is valid, and
one of the two-step or the four-step RA procedure for the first RACH configuration based on the priority order.

15. A base station (BS), comprising:
a transceiver configured to:
transmit first information for first parameters of a first random access channel (RACH) configuration associated with a first subset of slots from a set of slots on a cell,
transmit second information for second parameters of a second RACH configuration associated with a second subset of slots from the set of slots on the cell,
transmit third information for a condition, and
receive, for a random access (RA) procedure, a RACH in a slot from the second subset of slots based on:
the first RACH configuration when the condition is not valid, and
the second RACH configuration when the condition is valid.

16. The BS of claim 15, wherein:
a slot from the first subset of slots is not indicated for simultaneous transmission and reception during a same time-domain resource on the cell, and
a slot from the second subset of slots is indicated for simultaneous transmission and reception during a same time-domain resource on the cell.

17. The BS of claim 15, wherein:
the condition is one of:
a maximum counter value,
a maximum timer value,
a message reception, or
a signal reception quality value that is one of:
a reference signal received power level (RSRP), or
a reference signal received quality (RSRQ) value, and
the condition is valid when:
a number of random-access attempts is equal to or larger than the maximum counter value,
a duration since a first RACH transmission for the RA procedure is equal to or larger than the maximum timer value, the message indicates that the condition is valid, or a value associated with a measurement of a received reference signal is equal to or smaller than the signal reception quality value.

18. The BS of claim 15, wherein a value of a variable associated with the RA procedure based on the second RACH configuration is reset when the condition is valid and used as a value of a first parameter of the first RACH configuration.

19. The BS of claim 15, wherein:

a variable associated with the RA procedure based on the second RACH configuration is scaled by an adjustment value when the condition is valid and used as a value of a first parameter of the first RACH configuration, and the variable is associated with a value of a second parameter of the second RACH configuration that corresponds to the first parameter of the first RACH configuration.

20. The BS of claim 15, wherein:

the transceiver is further configured to transmit fourth information for a priority order associated with a two-step or a four-step RA procedure using the first or the second RACH configuration, and when the condition is valid, one of the two-step or the four-step RA procedure is used for the first RACH configuration based on the priority order.

* * * * *